United States Patent [19]
DeVito et al.

[11] Patent Number: 5,327,030
[45] Date of Patent: Jul. 5, 1994

[54] DECODER AND MONOLITHIC INTEGRATED CIRCUIT INCORPORATING SAME

[75] Inventors: Lawrence M. DeVito, Tewksbury; A. Paul Brokaw, Burlington, both of Mass.

[73] Assignee: Analog Devices, Inc., Norwood, Mass.

[21] Appl. No.: 878,489

[22] Filed: May 5, 1992

Related U.S. Application Data

[60] Continuation-in-part of Ser. No. 834,150, Feb. 10, 1992, abandoned, which is a division of Ser. No. 483,657, Feb. 23, 1990, Pat. No. 5,087,894, which is a division of Ser. No. 120,118, Nov. 13, 1987, Pat. No. 4,904,921.

[51] Int. Cl.⁵ .......................... H03K 5/24; G06G 7/12
[52] U.S. Cl. .................... 307/498; 307/350; 318/652; 318/657; 323/264; 323/347; 324/207.18; 340/870.36
[58] Field of Search ............... 307/309, 515, 231, 355, 307/498, 350; 324/207.18; 340/870.36; 318/657, 652; 323/347, 264

[56] References Cited

U.S. PATENT DOCUMENTS

| | | | |
|---|---|---|---|
| 3,235,790 | 2/1966 | Collins | 324/208 X |
| 3,684,961 | 8/1972 | Muir | 318/656 X |
| 3,737,640 | 6/1973 | Pao et al. | 235/195 |
| 3,961,206 | 6/1976 | Lau | 307/261 |
| 4,140,998 | 2/1979 | Bettle | 340/199 |
| 4,455,555 | 6/1984 | Symonds et al. | 340/870.36 |
| 4,475,169 | 10/1984 | Gilbert | 364/817 |
| 4,476,538 | 10/1984 | Gilbert | 364/817 |
| 4,514,689 | 4/1985 | Gerard | 318/657 X |
| 4,667,158 | 5/1987 | Redlich | 340/870.36 |
| 4,678,991 | 7/1987 | Schmidt | 318/657 X |
| 4,694,246 | 9/1987 | Auisse | 340/870.36 X |
| 4,904,921 | 2/1990 | DeVito et al. | 323/264 |
| 4,982,156 | 1/1991 | Lewis et al. | 324/207.18 |

FOREIGN PATENT DOCUMENTS

| | | |
|---|---|---|
| 0028743 | of 1981 | European Pat. Off. |
| 3602107 | 7/1987 | Fed. Rep. of Germany |
| 0697800 | 11/1979 | U.S.S.R. |
| 2131558 | 5/1984 | United Kingdom |

OTHER PUBLICATIONS

Patent Abstracts of Japan, vol. 6, No. 137, (P-130) (1015), 24 Jul. 1982 and JP 5759116A, 9 Apr. 1982.
Seimens-Zeitschrift, vol. 45, No. 10, Oct. 1971, pp. 740-743.
Elektronik, vol. 36, No. 1, Jan. 1987, pp. 40-42.

(List continued on next page.)

Primary Examiner—John Zazworsky
Attorney, Agent, or Firm—Wolf, Greenfield & Sacks

[57] ABSTRACT

A monolithic interface circuit for use with a linear variable differential transformer (LVDT) position transducer. The interface circuit includes a drive circuit for providing an excitation signal of selectable frequency and amplitude to the LVDT primary winding. The interface circuit further includes a decoder responsive to signals induced in the LVDT secondary windings for computing the position p of the LVDT core as a solution to the equation $p = K(A-B)/(A+B)$, where A and B represent the signals induced in the primary winding and K is a constant scale factor. The decoder includes circuitry for rectifying and filtering the secondary signals, a charge balance loop responsive to the detected signals for providing a binary signal having a duty cycle representative of $B/(A+B)$, and an output circuit responsive to the binary signal for providing the position output. The decoder provides excellent scale factor stability and linearity and is relatively insensitive to variations in primary drive amplitude. In another embodiment, the decoder calculates the function K A/B using similar circuitry.

14 Claims, 23 Drawing Sheets

DECODER AND MONOLITHIC INTEGRATED CIRCUIT INCORPORATING SAME

CROSS-REFERENCE TO RELATED APPLICATIONS

This is a continuation-in-part of pending application Ser. No. 07/834,150 filed Feb.10, 1992, now abandoned, which is a division of application Ser. No. 07/483,657 filed Feb. 23, 1990, now U.S. Pat. No. 5,087,894, which is a division of application Ser. No. 07/120,118 filed Nov. 13, 1987, now U.S. Pat. No. 4,904,921.

FIELD OF THE INVENTION

This invention relates to interface circuitry for linear variable differential transformer position transducers and, more particularly, to a monolithic integrated circuit for driving the primary winding of a linear variable differential transformer and for decoding its secondary winding outputs to provide a highly accurate analog voltage representation of core position. The interface circuitry is intended primarily for use with linear variable differential transformers but is not limited to such use.

BACKGROUND OF THE INVENTION

The linear variable differential transformer (LVDT) is a commonly-used linear position transducer that includes a movable magnetic core, a primary winding and two secondary windings. Since there is no contact between the core and the windings, there is no friction and no mechanical wear to limit the life of the transducer. This is especially important in high reliability applications and in hostile environments. As an example, the control surfaces of aircraft exhibit vibration which would quickly destroy a mechanical contact-type transducer. The position of the magnetic core determines the voltage induced on each of the two secondary windings. When the core is approximately centered in the secondary windings, an equal voltage is induced on each secondary winding. As the core is displaced from the center, or null point, the voltage induced on one secondary winding increases while the voltage on the other secondary winding decreases. The two secondary windings are usually connected in series opposing, and the resulting difference voltage is measured. The phase relative to the primary voltage indicates the direction relative to the null point. In this scheme, the primary drive voltage is a scale factor that directly affects the output voltage, and must be stabilized.

Another prior art detection scheme for LVDT's employs synchronous full wave detection. Since the output voltage goes to zero at the null point, the reference signal for synchronous detection must be derived from the primary drive signal. Since there is usually a phase shift between the primary and secondary signals, a compensating phase shift must be added to the reference signal. The required phase shift complicates the detection technique, and errors are introduced if the phase shift is incorrectly compensated. In this scheme, the scale factor is also sensitive to amplitude variations of the primary drive signal.

In the past, the interface circuitry for LVDT's was mounted on printed circuit boards and required various adjustments, thereby making LVDT's relatively inconvenient to use as position transducers. It is desirable to incorporate the drive and detection circuitry for LVDT's into a module or integrated circuit that provides a voltage representative of core position. Such an integrated circuit should be highly accurate and should be adaptable for use with a variety of different LVDT types. In addition, it should have a minimum of required external components, particularly variable components and active components, and should be easy to use.

An integrated LVDT interface circuit is described by Nicholas C. Gray in "Simplifying LVDT Signal Conditioning," *Machine Design*, May 7, 1987, pp. 103–106 and by Zahid Rahim, "LVDT Interface Chip's Functional Blocks Offer Versatility," *EDN*, May 29, 1986, pp. 159–168. The interface circuit described in those references utilizes the traditional technique of synchronous detection. An external voltage reference and an external adjustment of the reference signal phase are required. Since synchronous detection is utilized, the above-described sensitivity to variations in primary drive voltage is present. In addition, a change in phase shift from the primary to the secondary or an error in the phase shift network represents a scale factor error.

An LVDT interface circuit having a binary encoded output is described by Daniel Denarc in "Transducer Converters Ease Industrial Measurements," *Electronic Design*, Sep. 4, 1986, pp. 118–124. The disclosed interface circuit utilizes a ratiometric closed loop conversion technique. Another digital LVDT interface circuit is described in *DDC News*, October 1987.

It is desirable to provide an LVDT interface circuit that is insensitive to primary voltage variations, that has a scale factor and offset which are relatively insensitive to temperature variations and that has substantially better linearity than the LVDT transducer. Furthermore, the circuit must be small in size, have a minimum of external components and be convenient to use.

It is a general object of the present invention to provide a novel monolithic interface circuit for linear variable differential transformers.

It is another object of the present invention to provide an LVDT interface circuit which generates an analog output voltage that is a highly accurate representation of core position.

It is yet another object of the present invention to provide an LVDT interface circuit having a scale factor, which relates output voltage to LVDT core position, that is highly stable as a function of ambient temperature.

It is still another object of the present invention to provide an LVDT interface circuit that has an output voltage which is substantially insensitive to variations in the primary drive voltage.

It is a further object of the present invention to provide an LVDT interface circuit wherein a single passive component determines the scale factor which relates output voltage to LVDT core position.

It is a further object of the present invention to provide an LVDT interface circuit that has substantially better transfer function linearity than conventional LVDT interface circuits.

It is a further object of the present invention to provide an LVDT interface circuit that can selectably generate an output which is the integral of core position for closed loop applications.

It is a further object of the present invention to provide an LVDT interface circuit in which the primary drive signal is easily programmable in amplitude and frequency.

It is another object of the present invention to provide a monolithic integrated LVDT interface circuit that is compact and requires a minimum of external components.

It is another object of the present invention to provide a decoder for processing a pair of signals of equal frequency to determine the ratio of amplitudes.

SUMMARY OF THE INVENTION

According to the present invention, these and other objects and advantages are achieved in a decoder for processing a pair of signals of equal frequency to determine their relative amplitudes. The decoder is typically used in an interface circuit for a linear variable differential transformer position transducer, but is not limited to such use. The LVDT includes a primary winding, a pair of secondary windings and a movable core. The decoder is responsive to signals induced in the secondary windings of the LVDT for computing the position of the LVDT core.

In a first embodiment of the invention, the decoder includes means for rectifying and filtering a pair of signals to provide detected A and detected B signals, a charge balance loop responsive to the detected A and detected B signals for providing a binary signal having a duty cycle representative of $B/(A+B)$ (or $A/(A+B)$ if the variables are defined differently), where A and B represent the respective amplitudes of the pair of signals, and output circuit means responsive to the binary signal for providing the value of $K(A-B)/(A+B)$, where K is a constant scale factor.

The charge balance loop in the first embodiment preferably comprises first multiplier means for multiplying the detected A signal by the binary signal and providing a first multiplier output, second multiplier means for multiplying the detected B signal by the binary signal inverted and providing a second multiplier output, integrator means responsive to the first multiplier output for integrating in one direction and responsive to the second multiplier output for integrating in the opposite direction, and comparator means for comparing the output of the integrator means with a predetermined reference signal and providing the binary signal.

The output circuit means preferably comprises means for providing a reference current, third multiplier means for multiplying the reference current by the binary signal and providing a third multiplier output, fourth multiplier means for multiplying the reference current by the binary signal inverted and providing a fourth multiplier output, summing means for obtaining the difference between the third multiplier output and the fourth multiplier output, lowpass filter means for filtering high frequency components of the difference output of the summing means and operational amplifier means for converting the filtered difference output to an output voltage.

In a second embodiment of the invention, the decoder includes means for rectifying and filtering a pair of signals to provide detected A and detected B signals, a charge balance loop responsive to the detected A-and detected B signals for providing a binary signal having a duty cycle representative of $(B-A)/2B$, where A and B represent the respective amplitudes of the pair of signals, and output circuit means responsive to the binary signal for providing the value of K A/B, where K is a constant scale factor.

The charge balance loop in the second embodiment preferably comprises first multiplier means for multiplying the detected B signal by the binary signal and providing a first multiplier output, second multiplier means for multiplying the detected B signal by the binary signal inverted and providing a second multiplier output, integrator means responsive to the detected A signal and to the first multiplier output for integrating in one direction and responsive to the second multiplier output for integrating in the opposite direction, and comparator means for comparing the output of the integrator means with a predetermined reference level and providing the binary signal.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1A:
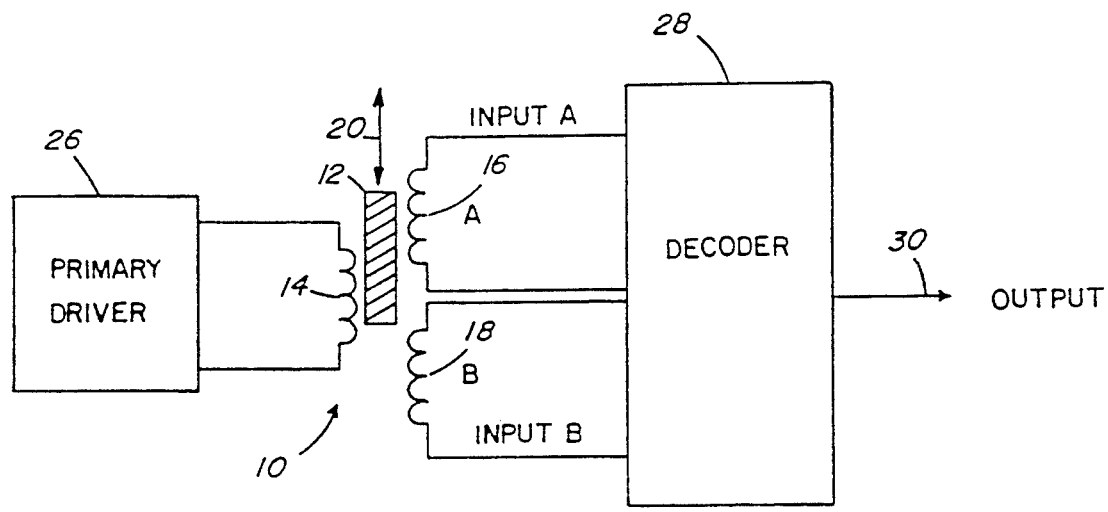
FIG. 1A is a simplified block diagram of an LVDT system in accordance with the present invention.

A block diagram of an LVDT system in accordance with the present invention is shown in FIG. 1A. An LVDT 10 includes a movable core 12, a primary winding 14 and a pair of secondary windings 16 and 18 designated as A and B, respectively. The LVDT typically has the shape of a solenoid with the core 12 linearly movable along the axis in the direction indicated by the arrows 20 in FIG. 1A. The primary winding 14 is axially centered in the device, and secondary windings 16 and 18 are located on opposite ends of primary winding 14. Such devices are well-known in the prior art and are commercially available.

Figure 1B:
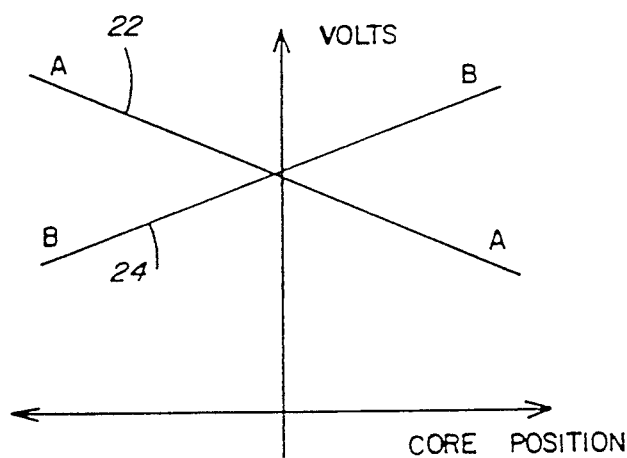
FIG. 1B is a graphic representation of LVDT secondary voltages as a function of core position.

The secondary output voltages of the LVDT 10 as a function of core 12 position are illustrated in FIG. 1B. The primary winding 14 is driven by a sine wave, and the output signals on secondary windings 16 and 18 are proportional to the displacement of core 12. As the core 12 moves in a positive direction, the signal in secondary winding 16 decreases as indicated by curve 22, and the signal in secondary winding 18 increases as indicated by curve 24. For core movement in a negative direction, the winding 16 signal increases, and the winding 18 signal decreases. When the core 12 is centered, the output voltages are equal. Typically, the two secondary windings 16 and 18 are connected with their voltages opposing each other so that at the center or null position, the sum of the output signals is zero.

The LVDT interface circuit of the present invention includes a primary driver 26 that supplies a sine wave excitation signal to primary winding 14. As described hereinafter, the excitation signal is programmable in both frequency and amplitude so that a variety of different LVDT types can be utilized with the circuit. The LVDT interface circuit further includes a decoder 28 that receives the secondary voltages from secondary windings 16 and 18 and provides a highly accurate analog output signal on a line 30. As described hereinafter, the decoder 28 does not require a phase shifted primary reference signal. Furthermore, the decoder 28 calculates an output value that is substantially independent of the primary drive amplitude, thereby improving accuracy.

Figure 2:
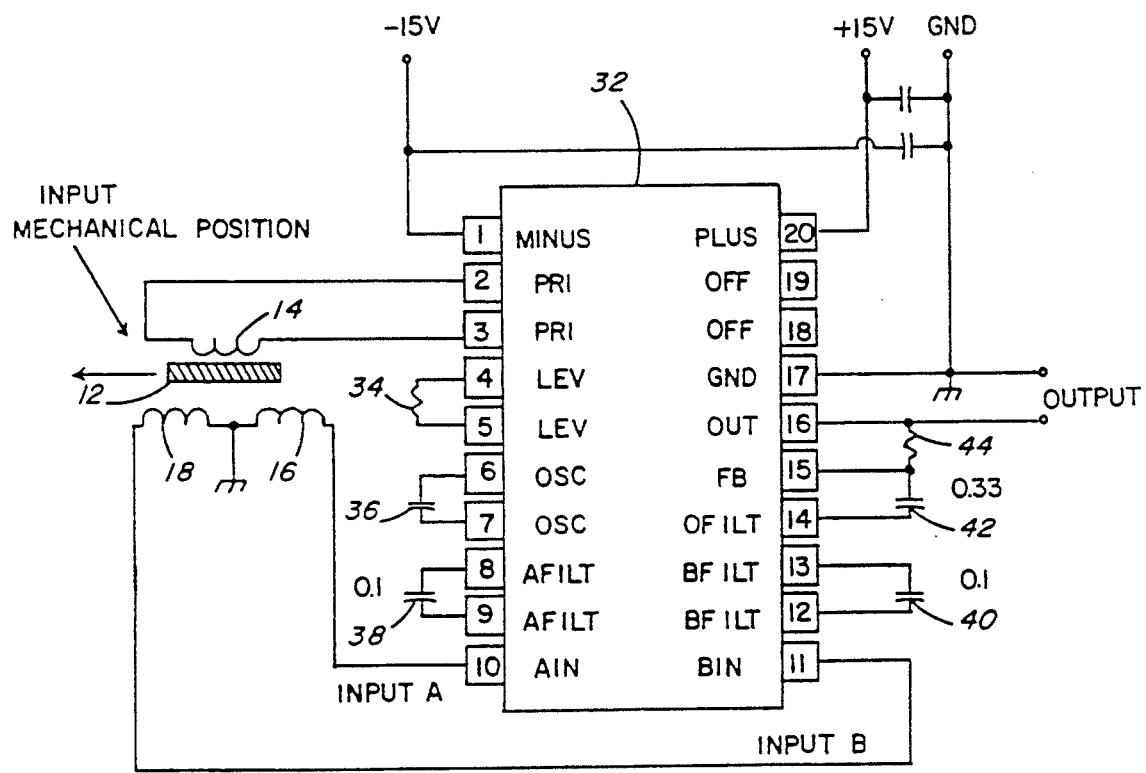
FIG. 2 is an interconnection diagram for the monolithic LVDT interface circuit in accordance with the present invention.

The LVDT circuit of the present invention is a monolithic integrated circuit. A typical interconnection diagram is shown in FIG. 2. An integrated circuit package 32 includes primary driver 26 and decoder 28. Primary winding 14 is coupled to pins 2 and 3 of package 32; one terminal of secondary winding 16 is coupled to pin 10; one terminal of winding 18 is coupled to pin 11; and the other terminals of windings 16 and 18 are coupled to ground. Either terminal of secondary windings 16, 18 can be connected to the interface circuit. This is an important advantage since the secondary windings 16, 18 can't be connected incorrectly by the user. A resistor 34 coupled between pins 4 and 5 determines the amplitude of the primary drive signal, and a capacitor 36 coupled between pins 6 and 7 determines the frequency of the primary drive signal. A capacitor 38 coupled between pins 8 and 9 and a capacitor 40 coupled between pins 12 and 13 establish time constants of secondary signal filters. A capacitor 42 coupled between pins 14 and 15 establishes a time constant of a duty cycle signal filter in the decoder as described hereinafter. A resistor 44 coupled between pins 15 and 16 establishes the scale factor between output voltage and core 12 movement. The output signal is taken between pins 16 and 17. Positive and negative supply voltages, typically 15 volts, are supplied to pins 20 and 1, respectively.

Figure 3:
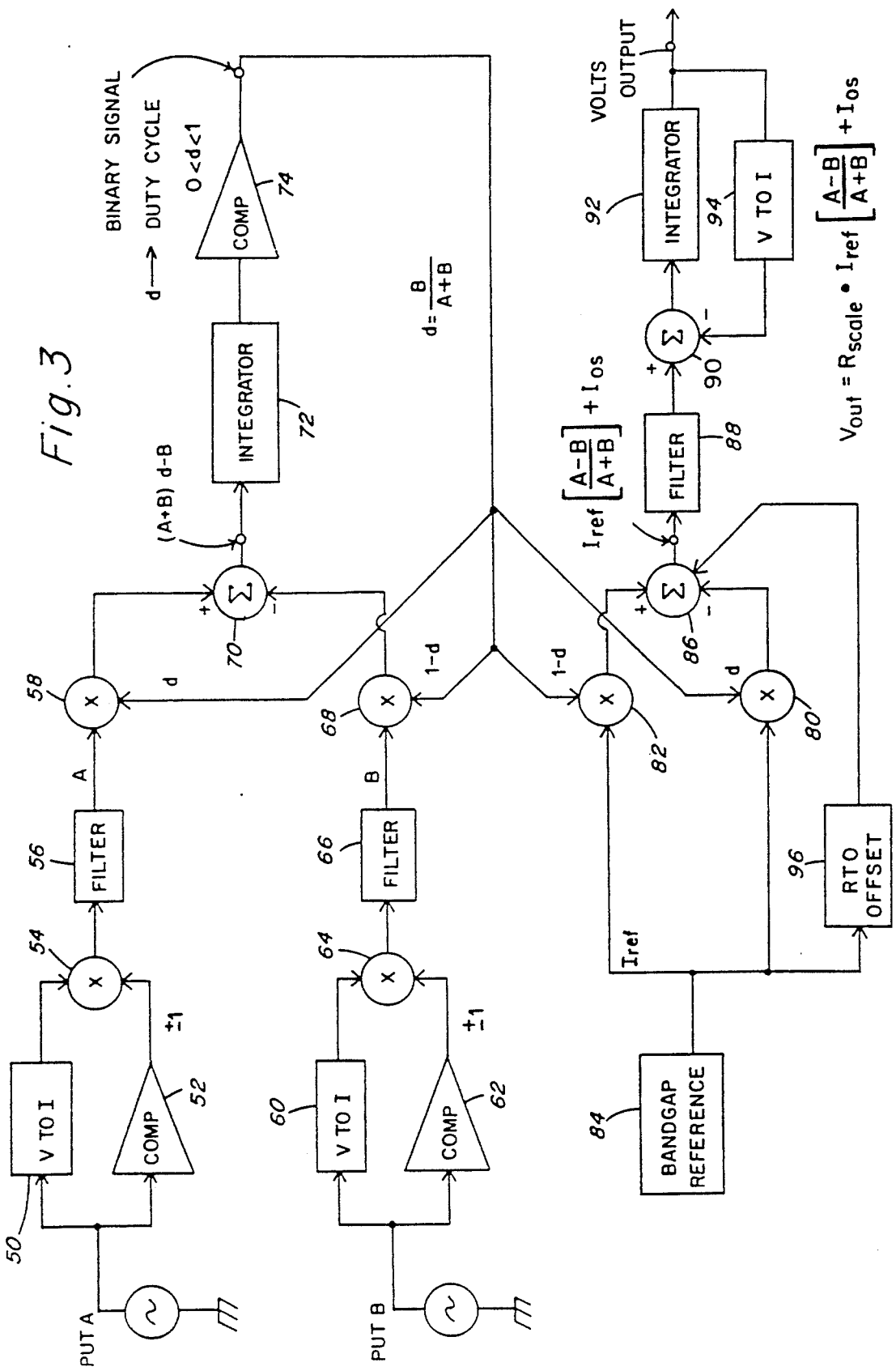
FIG. 3 is a functional block diagram of the decoder portion of the LVDT interface circuit.

A block diagram of the decoder 28 is shown in FIG. 3. The input signals, INPUT A and INPUT B, are sine waves from the LVDT secondary windings 16 and 18, respectively. The INPUT A and INPUT B signals may be shifted in phase relative to each other, depending on the type of LVDT and the core position, by as much as 10°. The phase can also have a 180 degree ambiguity depending on how the secondary windings 16, 18 are connected to the interface circuit. The INPUT A signal is supplied to a voltage-to-current converter 50 and to a comparator 52. The outputs of converter 50 and comparator 52 are supplied to a multiplier 54. The output of multiplier 54 is coupled through a lowpass filter 56 to a duty cycle multiplier 58. Similarly, the INPUT B signal is supplied to a voltage-to-current converter 60 and to a comparator 62, the outputs of which are coupled to the inputs of a multiplier 64. The output of multiplier 64 is coupled through a lowpass filter 66 to a duty cycle multiplier 68. A duty cycle binary signal d is supplied to the other input of duty cycle multiplier 58, and a duty cycle binary signal 1-d is supplied to the other input of duty cycle multiplier 68. The outputs of multipliers 58 and 68 are algebraically summed by an adder 70 to provide $(A+B)d - B$. The adder 70 output is supplied to an integrator 72, and the integrator output is supplied to a comparator 74. The output of comparator 74 is the duty cycle binary signal d and 1-d which are connected back as the inputs to multipliers 58 and 68. (The binary signal d is the logical complement or inversion of the binary signal 1-d.)

In an alternative embodiment of the decoder, duty cycle multipliers 58 and 68 are replaced by analog multipliers, and comparator 74 is not used. The signal d is no longer a binary signal, but is now an analog signal. This variation of the decoder may find utility where speed is more important than accuracy.

The outputs of comparators 52 and 62 detect the zero crossings of the respective INPUT A and INPUT B signals and toggle the respective multipliers 54 and 64 operating on the sine wave input signals now converted to the current domain, multiplying by $+/-1$ to provide full wave rectification at the outputs of multipliers 54 and 64. The full wave rectified signals are lowpass filtered by filters 56 and 66 to extract a mean absolute deviation measure of the input signal amplitude.

The outputs of filters 56 and 66 are then processed in a charge balance loop comprising multipliers 58 and 68, adder 70, integrator 72 and comparator 74. The multipliers 58 and 68 are differential pair switches with the control input being the binary signal of duty cycle d. When the binary signal d is a square wave of 50% duty cycle, then $d = 0.5$ and each multiplier 58, 68 scales its signal input by 0.5. This corresponds to the null point of the LVDT where the INPUT A and INPUT B signals are equal. When the duty cycle of the binary signal is different from 50%, then the A and B channels are scaled by different amounts. The outputs of the multipliers 58 and 68 are subtracted by adder 70, and the difference is integrated by integrator 72. The output of integrator 72 is compared with a reference level by comparator 74, and the binary output of the comparator is the duty cycle control signal supplied back to multipliers 58 and 68.

The binary signal has a duty cycle d which continuously varies from zero to unity. By inverting the sense of the binary signal at the duty cycle multipliers, the d and 1-d signals are provided. Since the input to the integrator 72 is driven to zero, the output of comparator 74 has a duty cycle $d = B/(A+B)$. Thus, the duty cycle d of the binary signal provided by the charge balance loop represents the relative amplitudes of the INPUT A and INPUT B signals. The excellent linearity of the charge balance loop is the direct result of the inherent accuracy of the duty cycle multipliers 58 and 68. When the duty cycle multipliers 58, 68 are replaced by analog multipliers as described above, the linearity is degraded, but the inputs can change quickly and the output will accurately follow the difference between A and B normalized to the sum of their amplitudes, or $(A-B)/(A+B)$. Keeping the finite gain of integrator 72 in the expression for the loop output reveals $$\text{OUT} = \frac{A - B - \frac{s(T+1)}{G}}{A + B - \frac{s(T+1)}{G}} \quad (1)$$

where G = d.c. gain,
T = time constant of integrator, and
s = complex frequency.

This result shows that low integrator 72 gain can cause offsets and scale factor errors which will scale with A+B. This means that if the primary drive is not constant with temperature causing A+B to change and the integrator 72 gain is low, then offset and scale factor drifts can occur.

A parallel path is also driven by the binary signal output of comparator 74. The binary signal is supplied to a multiplier 80, and the binary signal inverted is supplied to a multiplier 82. The other inputs to duty cycle multipliers 80 and 82 are constant currents $I_{ref}$ derived from a bandgap reference 84. The outputs of multipliers 80 and 82 are subtracted by an adder 86. The output signal from adder 86 is a current expressed as $I_{ref}(A-B)/(A+B)$. The signal current from adder 86 is supplied through a lowpass filter 88 to an adder 90. The output of adder 90 is supplied through an integrator 92 to the output. The output signal is coupled through a voltage-to-current converter 94 back to adder 90. The output signal of the decoder can be expressed as $R_{scale}I_{ref}(A-B)/(A+B)$ where $R_{scale}$ is the user-selectable resistor 44 that establishes the scale factor as described hereinafter. A referred-to-output (RTO) offset 96 coupled from the bandgap reference 84 to adder 86 facilitates converting the bipolar output from the LVDT to a unipolar output. It may also be used to adjust the output to zero.

A detailed schematic of the LVDT decoder 28 is shown in FIGS. 4A-4D. The elements shown in the block diagram of FIG. 3 are enclosed by dashed lines. The V-to-I converter 50 (FIGS. 4C and 4D) includes transistors 102, 104, 106, 108 with PNP current sources including transistors 110, 112; NPN current sources including transistors 114, 116; and NPN current mirrors including transistors 210-220. Similarly, V-to-I converter 60 (FIGS. 4C and 4D) includes transistors 122, 124, 126, 128 with PNP current sources including transistors 130, 132; NPN current sources including transistors 134, 136; and NPN current mirrors including transistors 238-248. Transistors 140-148 provide appropriate bias currents to the converters 50 and 60. The scale factor of converter 50 is established by resistor 103, and the scale factor of converter 60 is established by resistor 123. The INPUT A signal is supplied to the base of transistor 102, and the INPUT B signal is supplied to the base of transistor 126. The configuration shown in FIGS. 4A and 4C was chosen to maximize input voltage swing with low supply voltages. Inputs can come within several $V_{be}$ of either supply, and the differential output currents come from NPN sources at VMINUS. The input devices are PNP transistors 102, 106 for the A channel, and transistors 122, 126 for the B channel. These devices operate as followers with a bias of 10 microamps supplied by transistors 114, 116, 134, 136, respectively. Since the inputs devices operate as followers, there is no nonlinearity to correct. The nonlinearities are primarily caused by the Early voltage, and the nonlinearity is better than 200 parts per million. The input devices are PNP because their emitter-base junctions are harder to destroy than that of NPN transistors.

The comparator 52 (FIG. 4C) includes transistors 150-164, and the comparator 62 (FIG. 4C) includes transistors 170-184. In comparator 52, the input devices 150, 152 are PNP for robustness. The INPUT A signal is supplied to the base of transistor 150. The transistors 154-160 form a regenerative latch. Transistors 154 and 158 can share a pocket in the integrated circuit as can transistors 156 and 160, thereby minimizing capacitance at these switching nodes. The comparator 62 has a similar structure with the INPUT B signal supplied to the base of transistor 172. Resistor 186 coupled between the collectors of transistors 150 and 152 and resistor 188 coupled between the collectors of transistors 170 and 172 each provide hysteresis and close the positive feedback loop for regeneration.

In the multiplier 54 (FIG. 4C), differential pair multipliers, including differential pair transistors 202, 204, and differential pair transistors 206, 208, perform the +/−1 multiplication under control of the outputs of comparator 52. The A current from converter 50 is supplied to transistors 202 and 204 through transistors 210, 212 and 214. The negative or inverted A current from converter 50 is supplied through transistors 216, 218 and 220 to transistors 206 and 208 of multiplier 54. Similarly, multiplier 64 (FIG. 4C) includes differential pair multipliers including differential pair transistors 230, 232, and differential pair transistors 234, 236 which perform the +/−1 multiplication under control of comparator 62. The converter 60 supplies the B current through transistors 238, 240, 242 to transistors 234, 236. The negative or inverted B current from converter 60 is supplied through transistors 244, 246, 248 to transistors 230 and 232.

The rectified output signal from multiplier 54 is coupled from transistors 204-208 to filter 56 (FIG. 4C) through resistors 250, 252 to cascode-connected transistors 254, 256. External filter capacitor 38 is coupled between resistors 250 and 252. Resistors 250 and 252 decrease the required value of the external filter capacitor 38. The circuit works well with a 0.1 microfarad capacitor 38 when the LVDT primary drive signal is 2.5 KHz. The filter 66 (FIG. 4C) for the B channel has a similar structure. The rectified output from multiplier 64 is coupled from transistors 230-236 through resistors 260, 262 to cascode-connected transistors 264, 266, respectively. External filter capacitor 40 is coupled between resistors 260 and 262.

The A channel duty cycle multiplier 58 (FIG. 4C) includes differential pair transistors 270, 272 and differential pair transistors 274, 276. The outputs from filter 56 are coupled to the common emitters of each differential pair, and the duty cycle binary signals d and 1-d are coupled to the bases of the differential pair transistors 270-276. For the fraction of time that they are turned on, transistors 272 and 274 couple the detected A channel signal to the integrator 72. When these transistors are off, then transistors 270 and 276 dump the A channel signal to the positive voltage supply VPLUS. When the A channel signal is connected to the integrator 72, the B channel signal is dumped to VPLUS and vice versa. The B channel duty cycle multiplier 68 (FIG. 4C) has a structure similar to multiplier 58 and includes differential pair transistors 280, 282 and differential pair transistors 284, 286. The outputs of filter 66 are coupled to the common emitters of each differential pair, and the duty cycle binary signals d and 1-d are coupled to the bases of the transistors 280-286. When they are turned on, transistors 280, 286 couple the detected B channel signal to integrator 72. When these transistors are off, transistors 282, 284 dump the B channel signal to the positive voltage supply VPLUS.

The subtraction represented by adder 70 in FIG. 3 is implemented simply by connecting the outputs of multipliers 58 and 68 so that the A signal causes the integrator 72 (FIG. 4A) to ramp up, while the B signal causes the integrator 72 to ramp down. At any given time, each channel is multiplied by one or zero, but averaged over time, the A channel is multiplied by the fraction of time that transistors 272 and 274 are turned on, and the B channel signal is multiplied by one minus this fraction. The simplicity and compactness of the multipliers 58, 68 is essential to conserve die area on the monolithic integrated circuit of the invention. The fraction of time that each signal is either discarded or coupled to the summing node constitutes an analog multiplication.

Figure 4A:
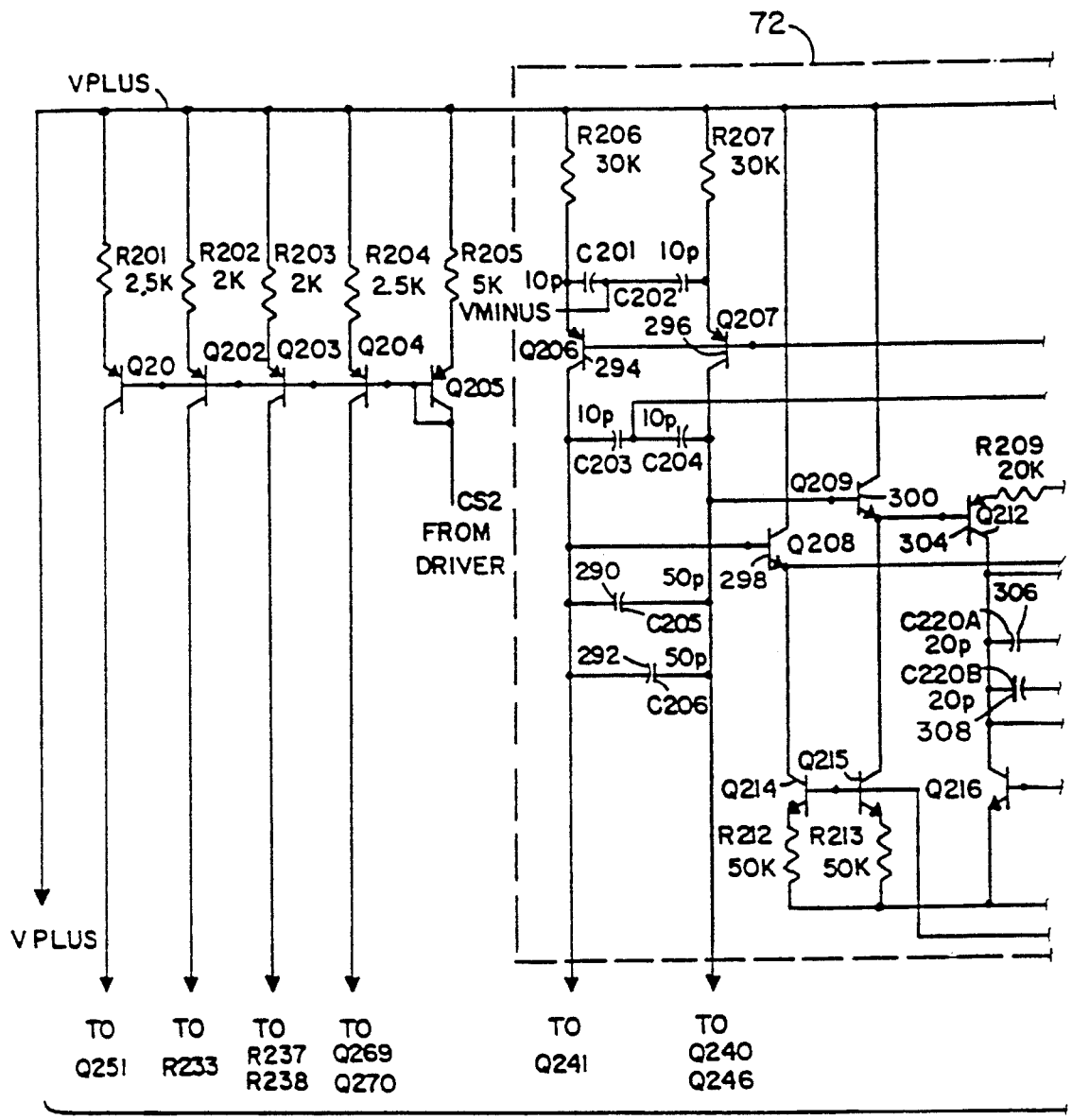
FIGS. 4A–4D include a detailed schematic of the decoder portion of the LVDT interface circuit.
Figure 4A:
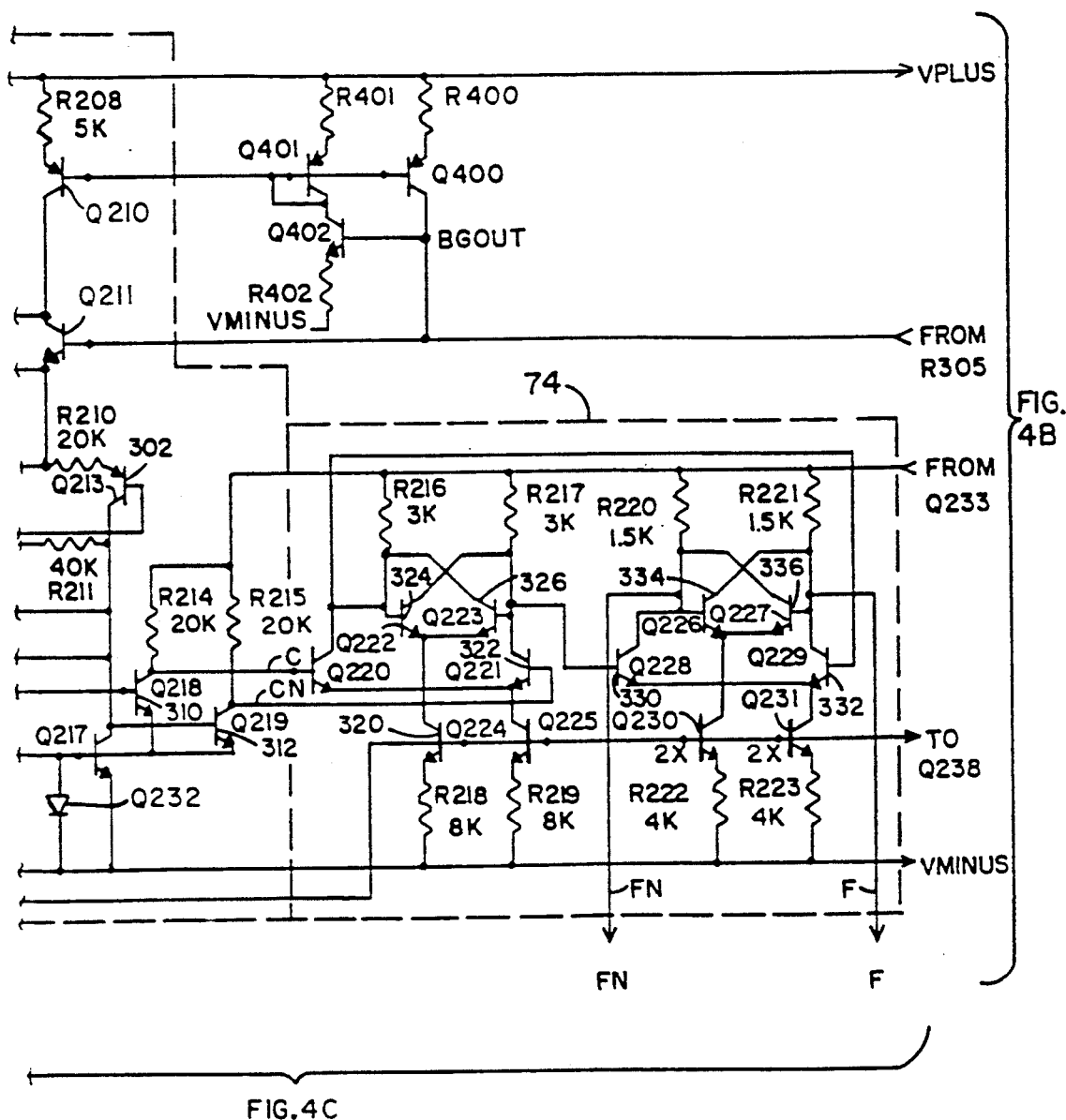

The outputs of multipliers 58 and 68 are coupled directly to opposite sides of integrator capacitors 290, 292 in integrator 72. Offset temperature stability is preserved by constructing the 100 picofarad integrator capacitor as two symmetric halves in order to balance the parasitic bottom plate leakage. Transistors 294 and 296 are current sources for the integrator capacitors 290, 292. Opposite sides of the integrator capacitors 290, 292 are coupled through follower transistors 298 and 300 and through transistors 302 and 304 to transistors 310, 312 which form a post amplifier that increases the d.c. gain of the integrator 72 and reduces the errors indicated in equation (1). It is desirable for the post amplifier to have limited bandwidth to limit the oscillation frequency of the charge balance loop. The bandwidth is limited by capacitors 306, 308 coupled between the collectors of transistors 302, 304. The frequency of the duty cycle binary signal is about constant for various input levels, but the amplitude of the integrator triangle wave changes as larger input signals cause faster ramp rates. The collectors of transistors 310, 312 are coupled to comparator 74 (FIG. 4A).

The comparator 74 comprises a two-stage regenerative latch for high gain and high speed. A first stage regenerative latch includes transistors 320, 322, 324, 326. A second stage regenerative latch includes transistors 330, 332, 334, 336. The output of the second stage is the duty cycle binary signal d and the duty cycle binary signal inverted 1-d, which are coupled to transistors 270-276 and 280-286 in multipliers 58 and 68, thereby closing the charge balance loop. The duty cycle binary signal also drives the multipliers 80 and 82 (FIG. 4D), which are implemented as a single differential pair including transistors 340 and 342.

Figure 4B:
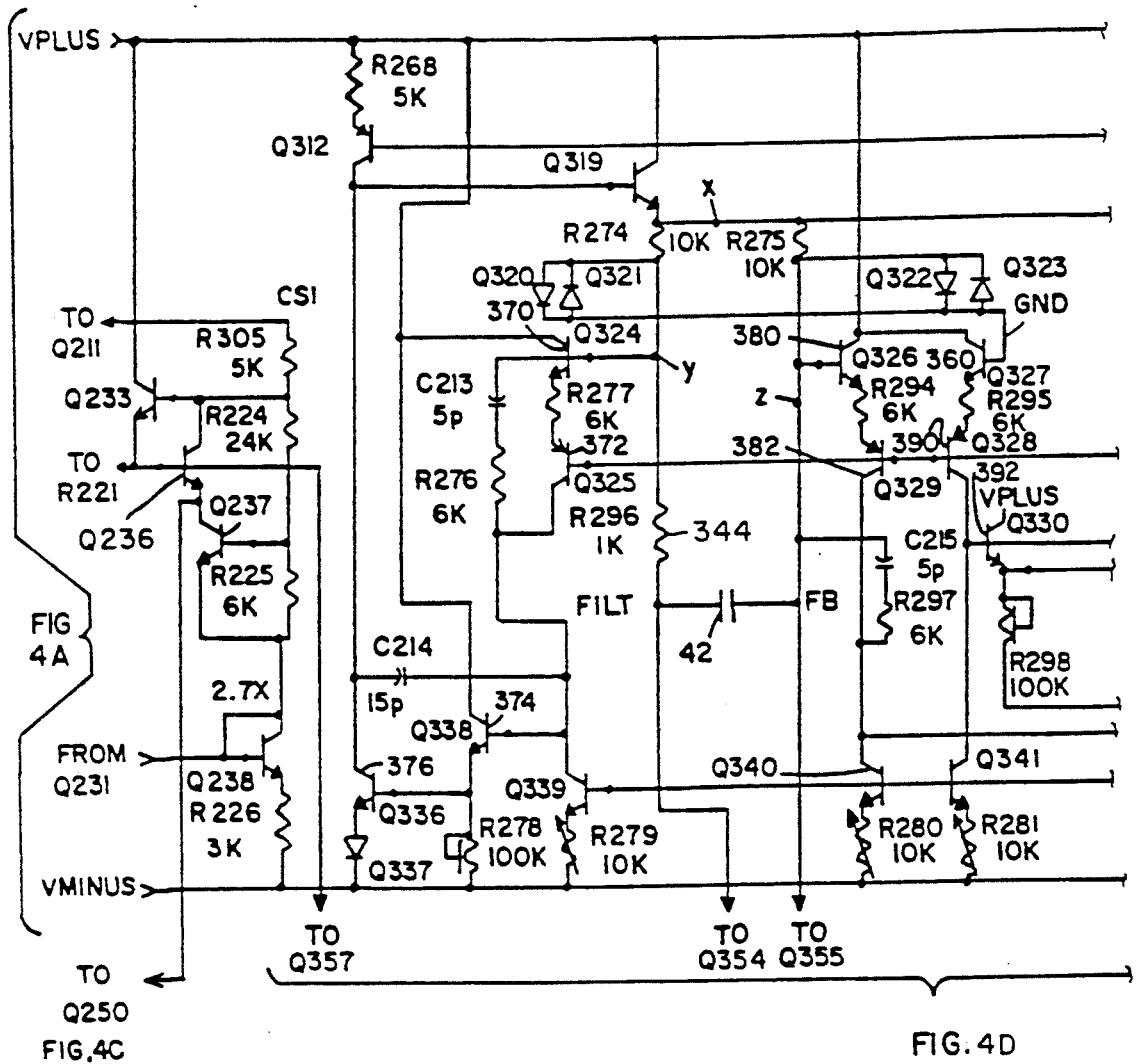
Figure 4B:
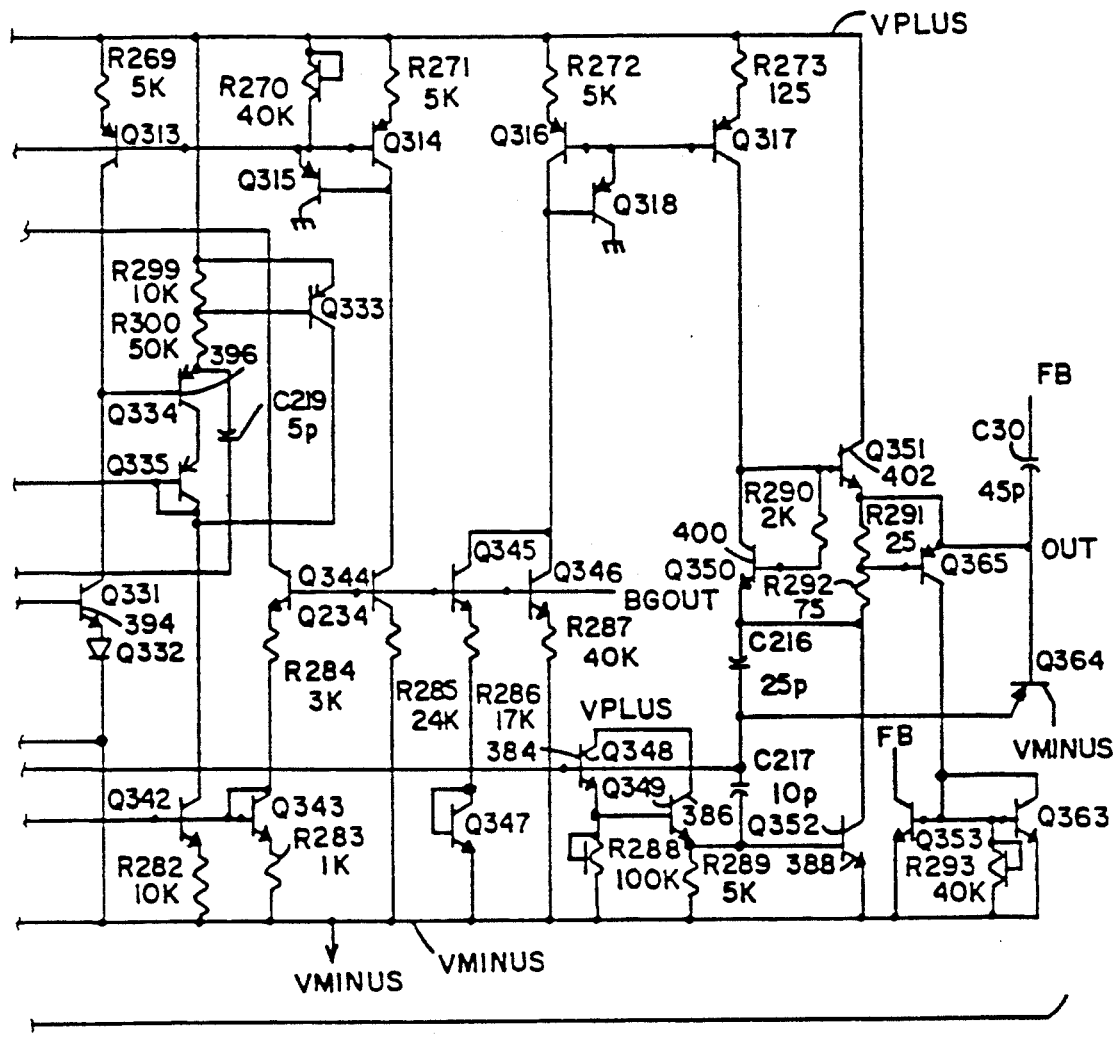
Figure 4C:
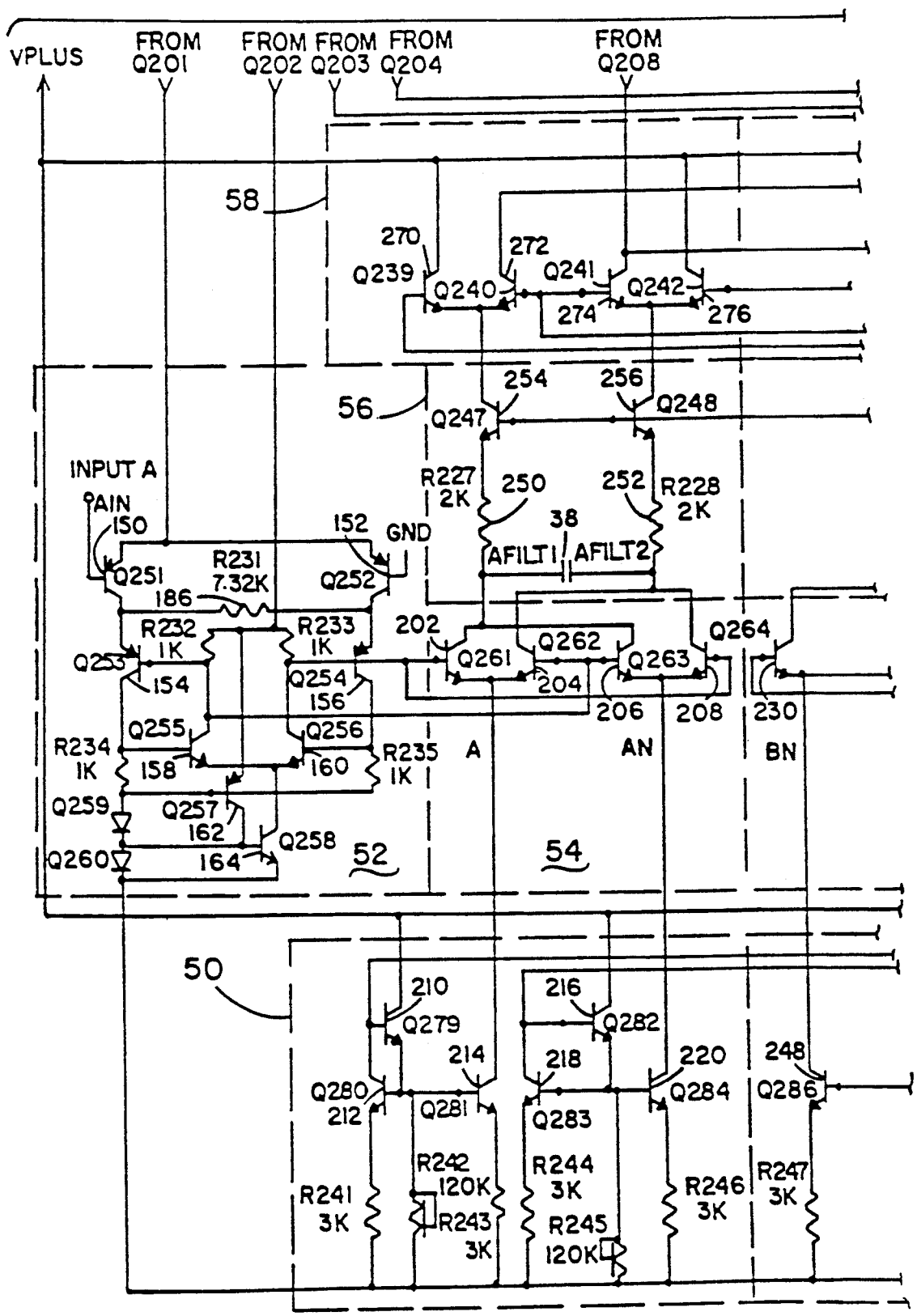
Figure 4C:
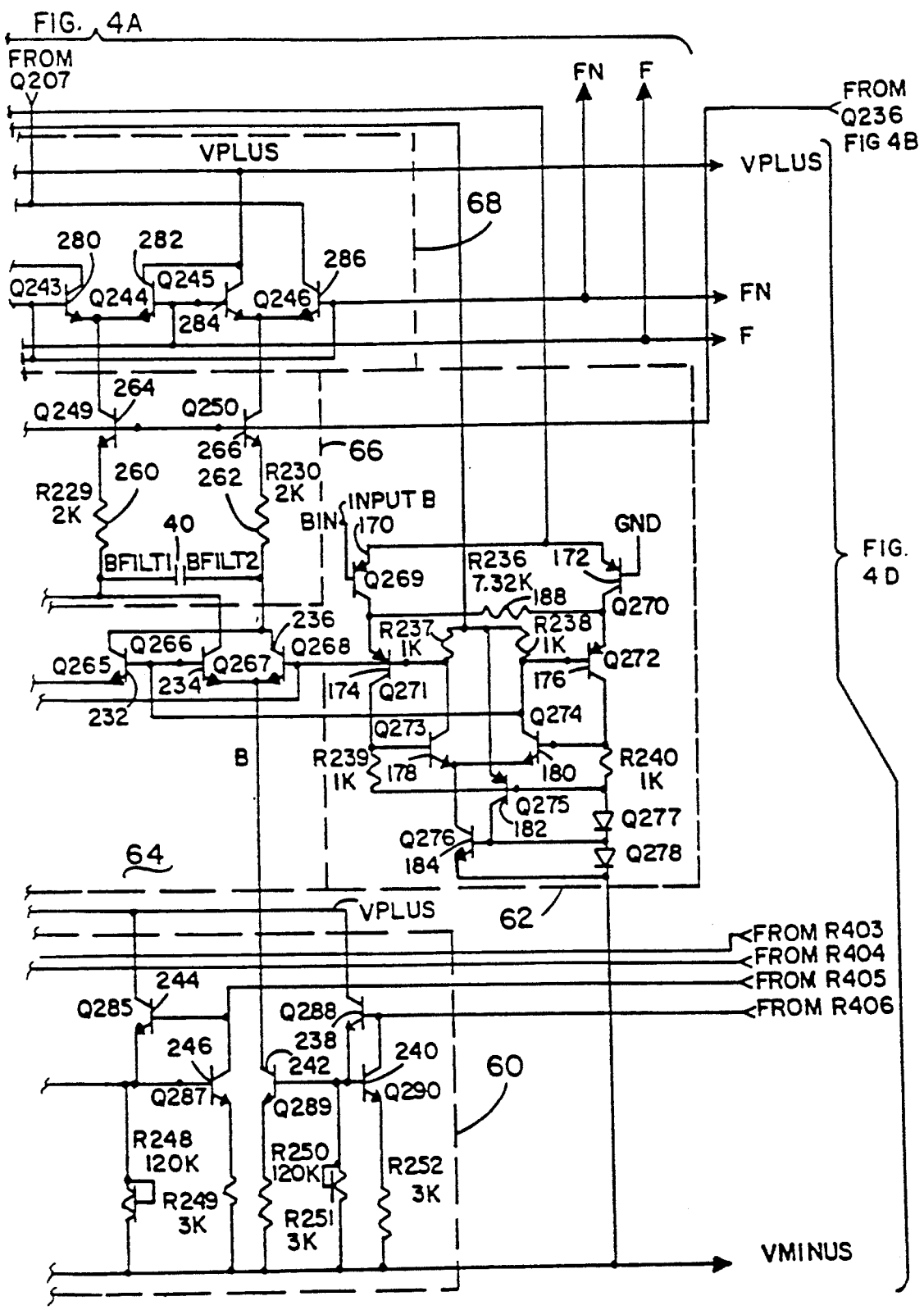
Figure 5:
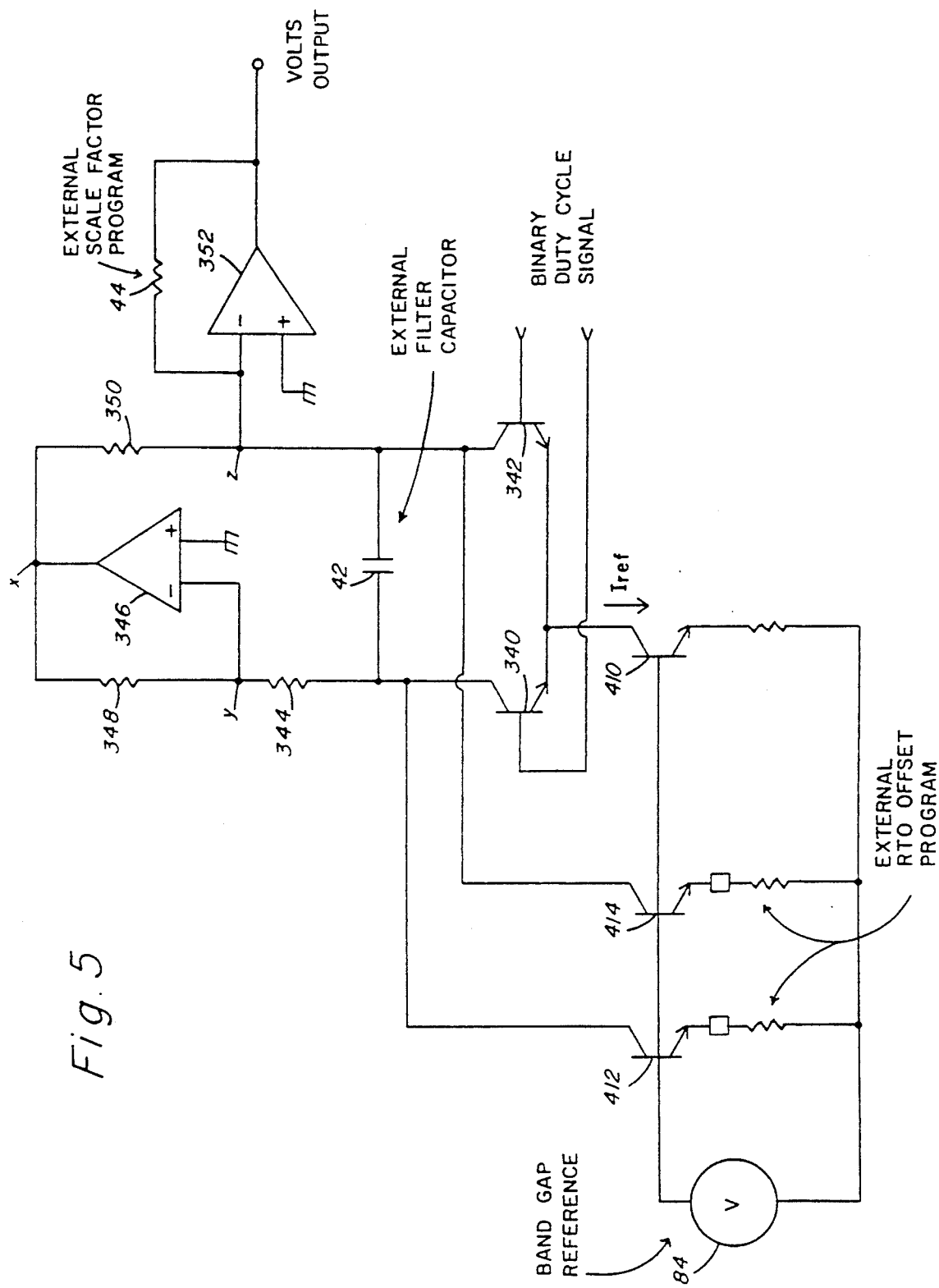
FIG. 5 is a simplified schematic diagram of the output circuit of the decoder of FIGS. 3 and 4A–4D.

The configuration of the output section (FIG. 4B) is shown in simplified form in FIG. 5. The requirements are to take the switched current from transistors 340 and 342, to filter out the high frequency components of the duty cycle binary signal and to supply the result to the output with a provision for a user-selectable scale factor. The external output filter capacitor 42 is coupled between the collectors of transistors 340 and 342. The collector of transistor 340 is coupled through a resistor 344 to the inverting input of an operational amplifier 346. A resistor 348 is coupled between the inverting input and the output of operational amplifier 346. The noninverting input of amplifier 346 is coupled to ground, and the output is coupled through a resistor 350 to the collector of transistor 342 and to the opposite side of capacitor 42. The collector of transistor 342 is also coupled to the inverting input of an operational amplifier 352. The external scale factor resistor 44 is coupled between the inverting input and the output of amplifier 352, and the noninverting input of amplifier 352 is coupled to ground. The output of amplifier 352 constitutes the voltage output of the decoder 28.

Amplifier 346 and resistors 348, 350 function as a current mirror that equalizes the currents in resistors 348 and 350. This can be seen by considering that the inputs to amplifiers 346 and 352 are maintained at virtual ground, while the output of amplifier 346 is coupled to both resistors 348 and 350. Thus, resistors 348 and 350 have equal voltages applied to them and their currents are equal. The current mirror sees only the low frequency signal representing mechanical movement of the core 12, while the high frequency duty cycle binary signal current flows in a tight loop through capacitor 42. The difference current is balanced at the summing junction of output operational amplifier 352. The feedback element for amplifier 352 is normally resistor 44 which programs the output voltage scale factor per unit of core movement. Alternatively, the feedback element can be a capacitor for signal integration, a useful feature when the LVDT is used in a closed loop configuration.

Since the operational amplifiers 346 and 352 have a common noninverting input, they can be merged in a novel amplifier configuration. Referring again to FIG. 4B, the node coupled to the base of transistor 360 and labelled GND is the noninverting input shared by both operational amplifier loops shown in FIG. 5 and is also the signal common. The nodes labelled x, y and z in FIG. 4B correspond to the nodes labelled x, y and z in FIG. 5. The merged operational amplifiers include transistors 370-402. Transistors 370, 372, 374, 376 comprise the amplifier 346. Transistors 380, 382, 384, 386, 388 comprise the amplifier 352. A third loop including transistors 360, 390, 392, 394 and 396 sets the bias for all three legs of the input. The output circuit includes transistors 388, 400 and 402. The external resistor 44 ($R_{scale}$) that establishes the user-selectable scale factor is coupled between the output terminal and node z of the amplifier. The output circuit was chosen for its ability to drive heavy capacitive loads. Since the output circuit is actually the loop integrator, a capacitive load on the output has the effect of gradually increasing the loop compensation and the circuit will not oscillate. The nonlinearity of the current input to voltage output of the output circuit is about two parts per million.

The output circuit shown in FIG. 4B provides several advantages. It converts a differential current supplied from transistors 340 and 342 into a single-ended voltage output. Although the reference input to the amplifier (noninverting inputs of amplifiers 346 and 352 in FIG. 5) is coupled to ground in the present configuration, this node can be coupled to any desired reference potential. The scale factor between the output voltage and the differential current input is established by a single scale resistor coupled between the output and node z. Thus, there is provided a three-input amplifier useful for converting a differential current to an output voltage with the scale factor being established by a single, user-selectable resistor.

Figure 4D:
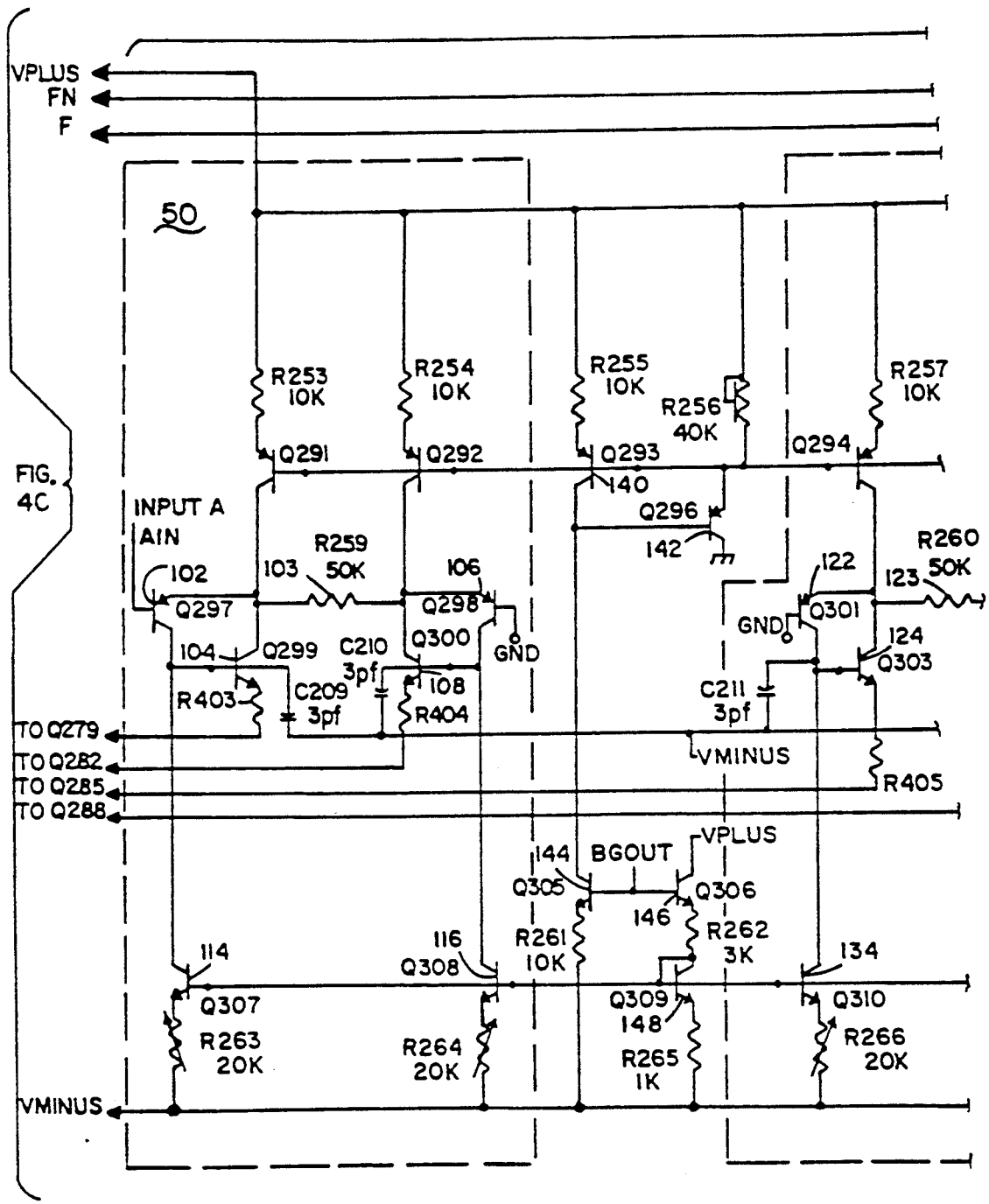
Figure 4D:
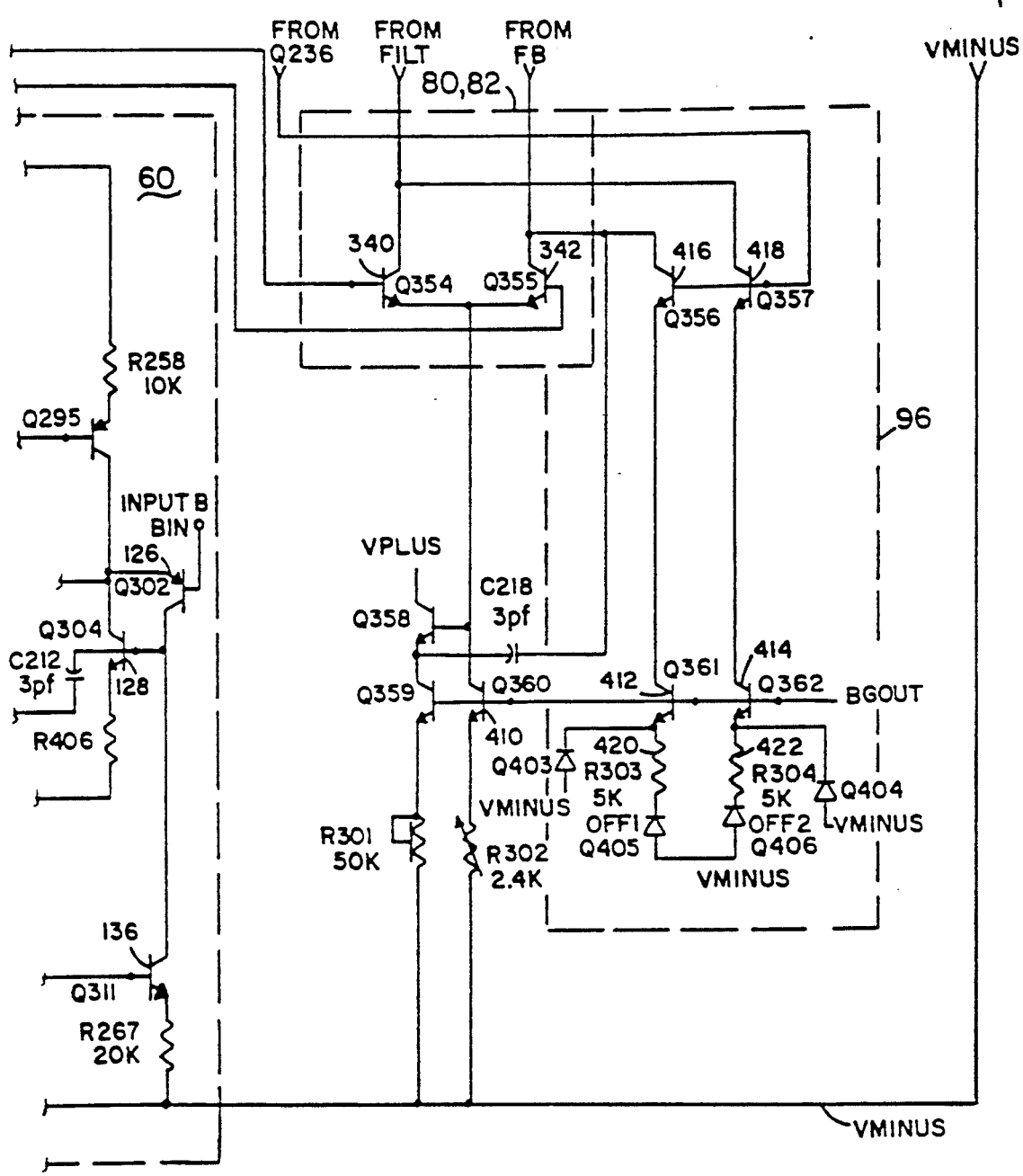

The tail or emitter current of transistors 340, 342 is a direct output scale factor and must be made low drift. The bandgap reference voltage is supplied to the base of transistor 410 (FIG. 4D), which acts as an emitter current source for transistors 340 and 342. The bandgap reference voltage is also supplied to the bases of transistors 412 and 414 (FIG. 4D). In the RTO offset 96, the collectors of transistors 412 and 414 are coupled through transistors 416, 418, respectively, to the collectors of transistors 340, 342 in the duty cycle multiplier. The emitters of transistors 412, 414 are coupled to resistors 420, 422, respectively. The output offset can be externally programmed by a resistor (not shown) connected between one of resistors 420, 422 and VMINUS or unequal resistors connected between resistors 420 and 422, respectively, and VMINUS.

Figure 6A:
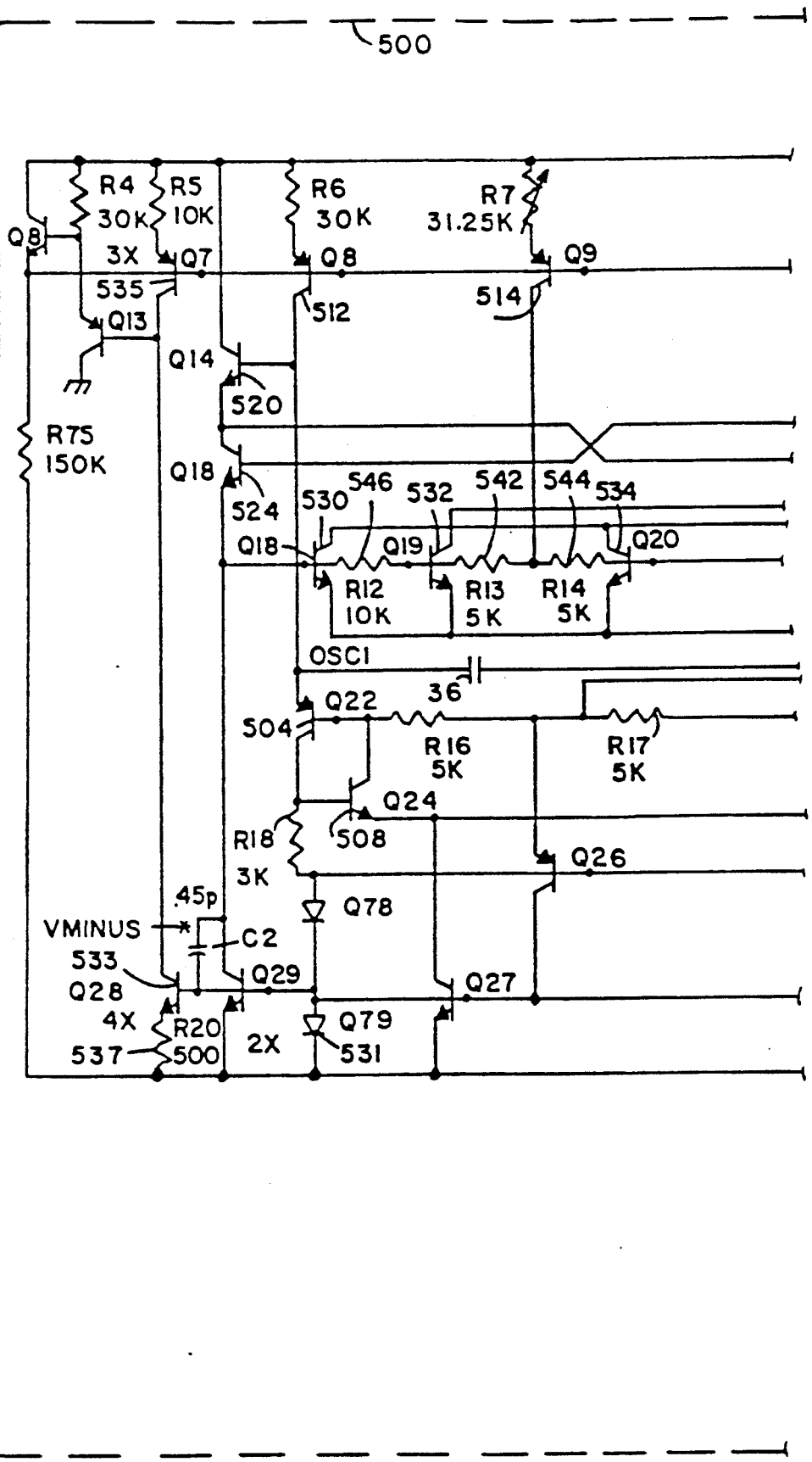
FIGS. 6A–6C include a detailed schematic diagram of the primary driver portion of the LVDT interface circuit.
Figure 6A:
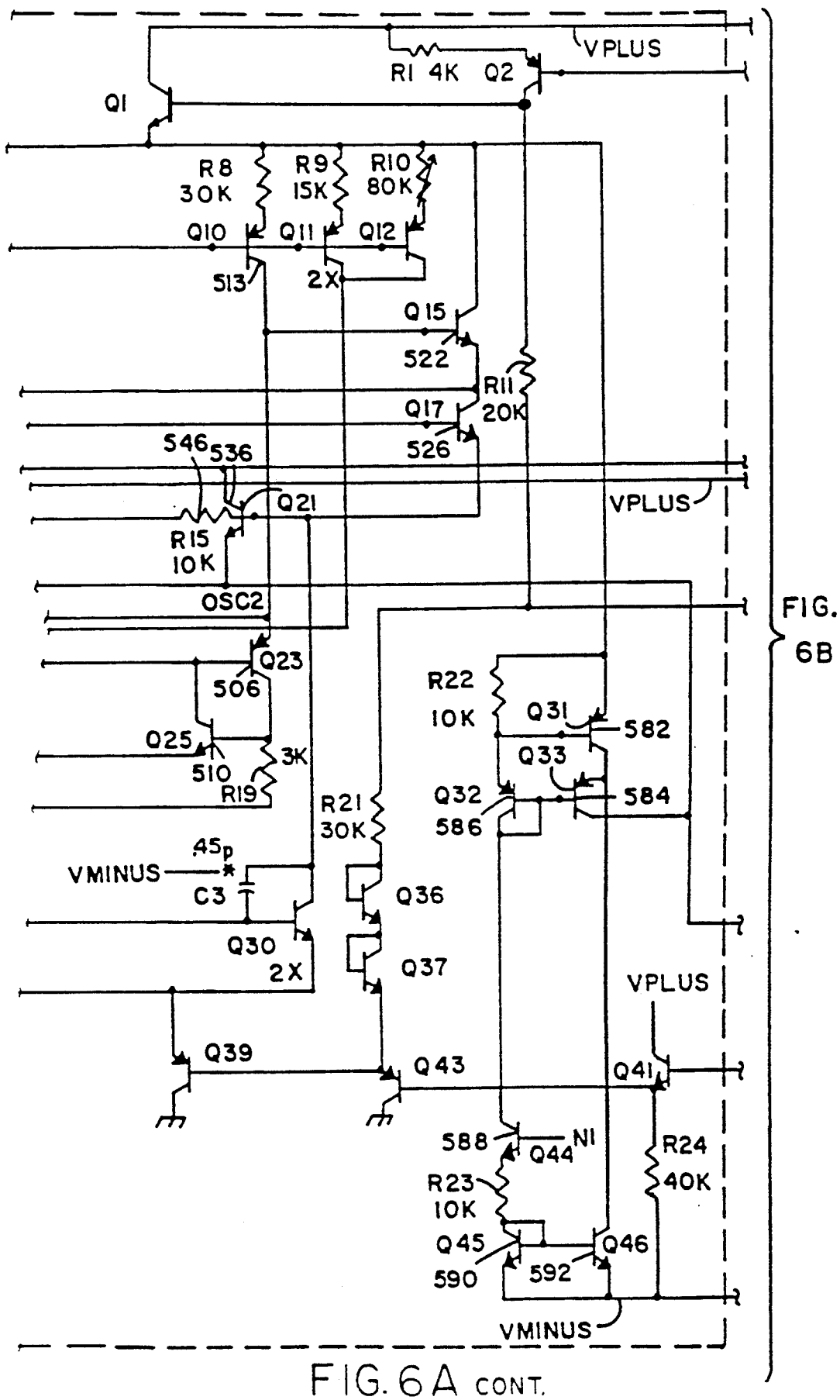
Figure 6B:
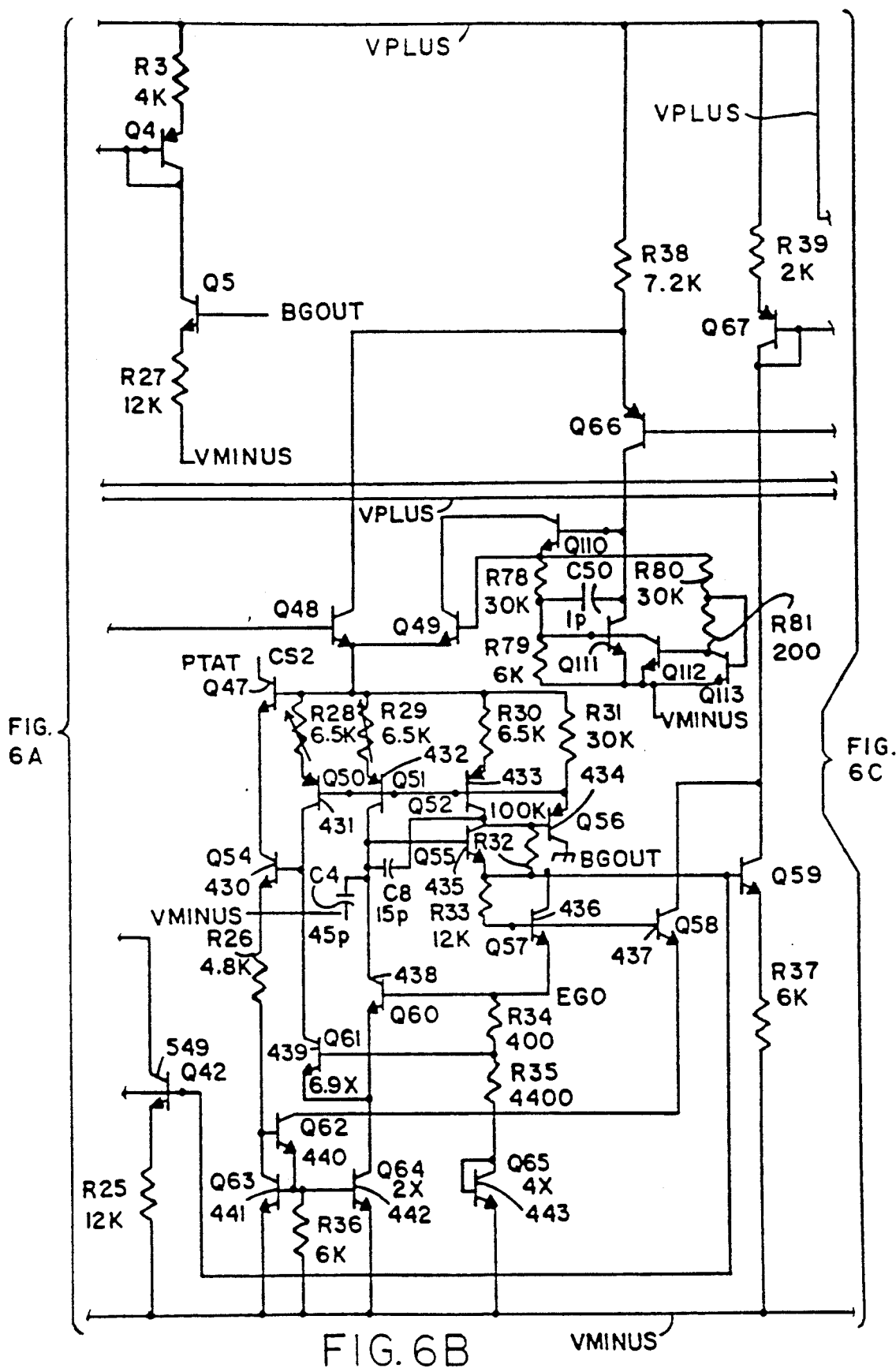

A schematic of the bandgap reference 84 is shown in FIG. 6B and includes transistors 430-443. The output BGOUT is a stable bandgap voltage plus one diode drop. The diode drop compensates for the base to emitter junction of the current sources being driven to provide temperature stable current sources.

A detailed schematic diagram of the primary driver 26 is shown in FIGS. 6A and 6B and includes a sine wave oscillator 500 and a power driver 502. In the oscillator 500 (FIG. 6A), a multivibrator includes transistors 504, 506, 508, 510 with transistors 512 and 513 functioning as current sources. The frequency is programmed by the external capacitor 36 coupled between the emitters of transistors 504 and 506. The multivibrator provides a triangular wave output which is buffered through a cross-coupled differential follower including transistors 520, 522, 524, 526.

The differential follower drives a sine wave shaper network including transistors 530, 532, 534, 536 and resistors 540, 542, 544, 546. The emitter of transistor 524 is coupled to the base of transistor 530 and is coupled through resistor 540 to the base of transistor 532. The emitter of transistor 526 is coupled to the base of transistor 536 and is coupled through resistor 546 to the base of transistor 534. The base of transistor 532 is coupled through resistor 542 to the collector of transistor 514, and the base of transistor 534 is coupled through resistor 544 to the collector of transistor 514. The emitters of transistors 530, 532, 534 and 536 are commonly coupled to the collector of current source transistor 549. The collectors of transistors 530 and 534 are coupled together and form one output of the sine wave shaper; the collectors of transistors 532 and 536 are coupled together and form the other output of the sine wave shaper. Transistor 514 functions as a current source for the sine wave shaper. The sine wave shaper configuration of FIG. 6A is advantageous in that only one current source 514 is required. The magnitude of the current supplied by transistor 514 can be varied in order to suppress harmonics in the sine wave output of the shaper. The tail current of the sine wave shaper is a 100 microampere temperature stable current from transistor 549 and the bandgap reference.

The amplitude and frequency of the sine wave should be constant with temperature. The current supplied by transistor 549 to the sine wave shaper is temperature stable. In order to provide a temperature stable sine wave output, the scale factor of the sine wave shaper and the peak-to-peak amplitude of the triangle wave supplied to the sine wave shaper must both be proportional to absolute temperature. This proportionality is established by diode 531, resistor 537 and transistors 533 and 535. As a result, the currents supplied by transistors 512, 513 and 514 are all proportional to absolute temperature. The scale factor of the sine wave shaper is established by the current from transistor 514 and resistors 542, 544, 540, 546. With this arrangement, the multivibrator frequency is constant with temperature, but its amplitude is proportional to absolute temperature. Consequently, the sine wave output of the shaper is temperature-stable in both amplitude and frequency.

Figure 6C:
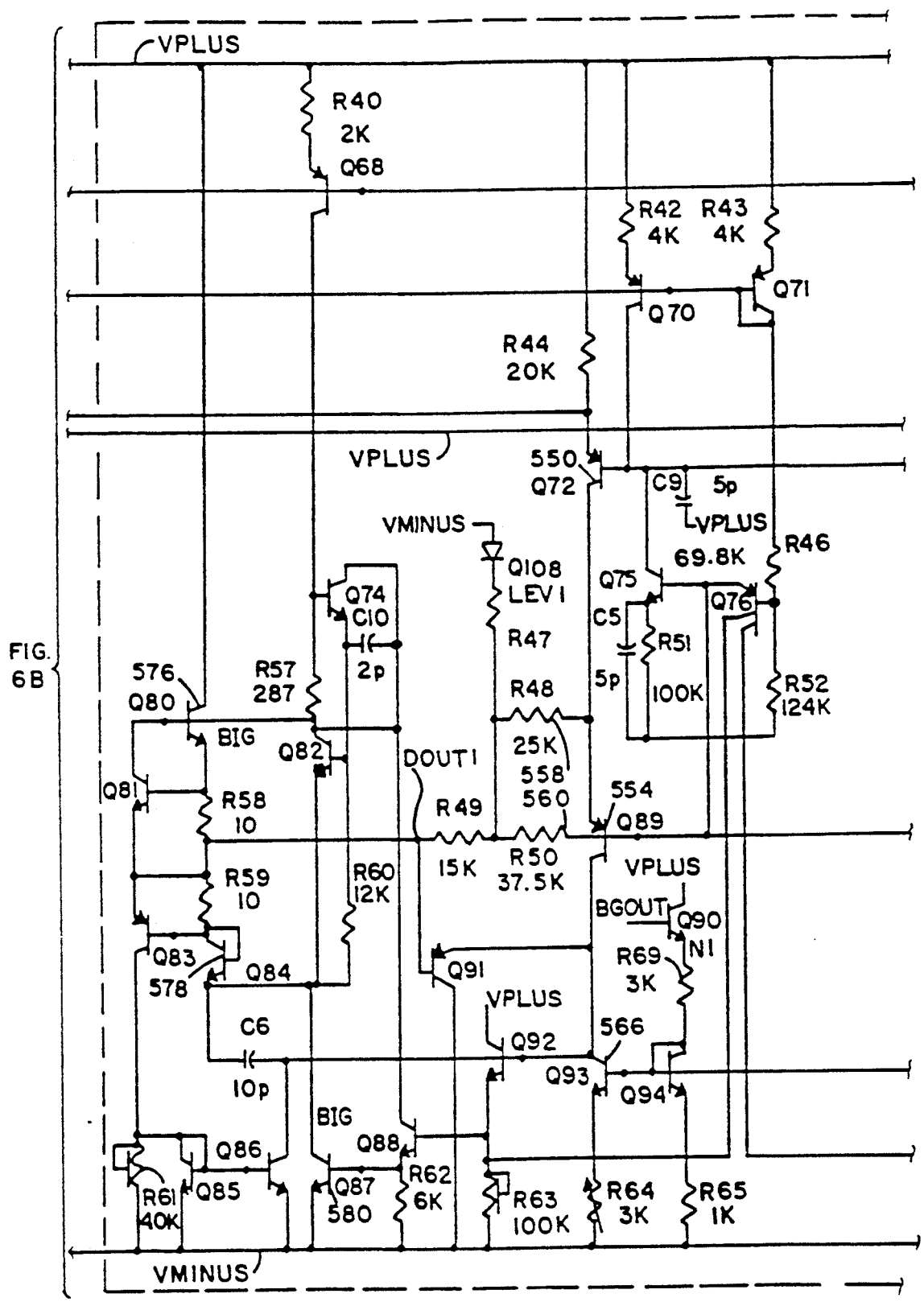
Figure 6C:
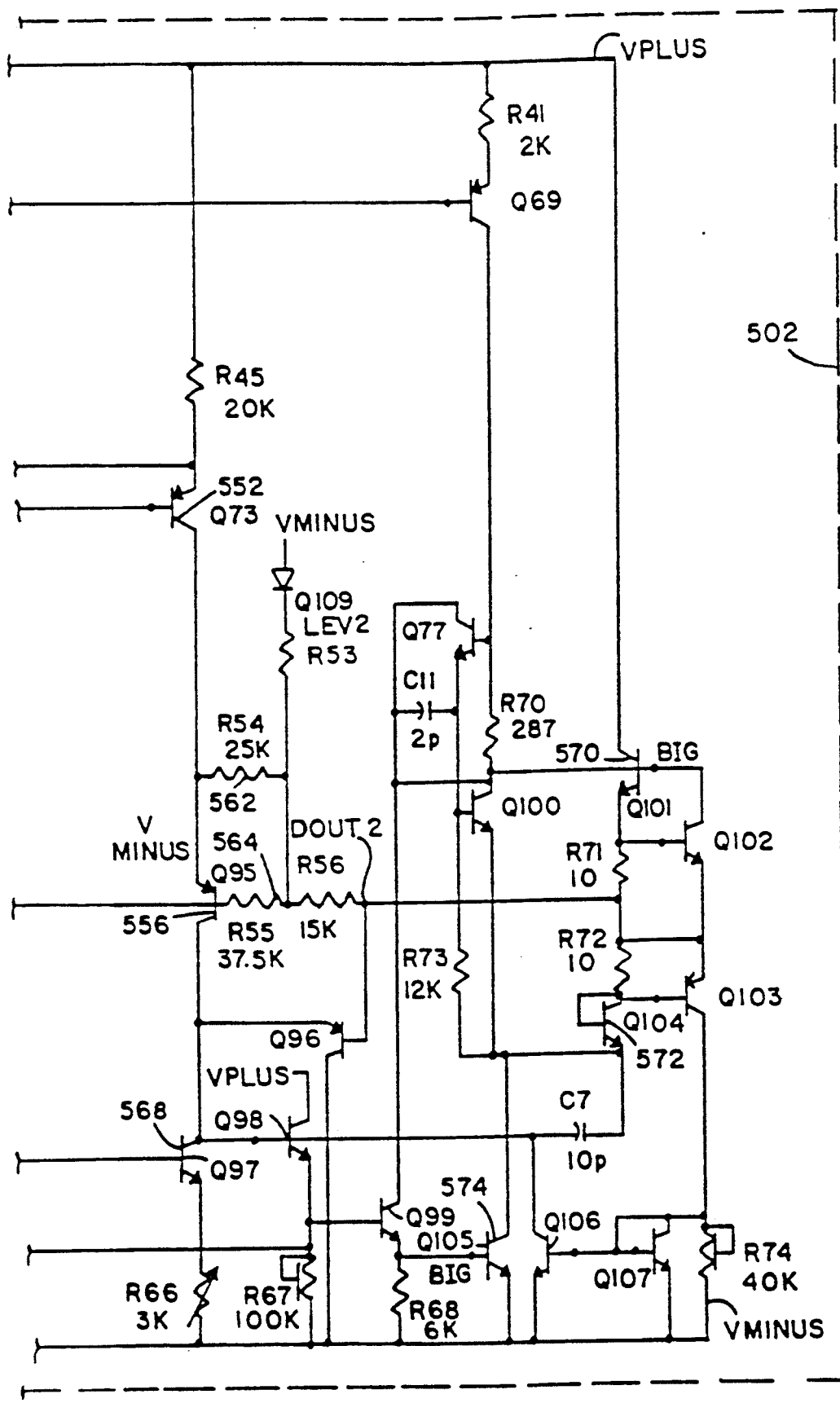

The sine wave output from the oscillator 500 is a differential current connected to the emitters of transistors 550, 552 in power driver 502 (FIG. 6C). The driver circuit performs two functions. It centers the common mode of the differential primary drive half-way between VPLUS and VMINUS. Transistors 554, 556 and resistors 558, 560, 562, 564 form V-to-I converters. The two nodes marked LEV are utilized to program the primary signal amplitude by shunting a portion of the signal. Since transistors 566 and 568 pass equal currents, the loop forces transistors 554 and 556 to have equal currents despite the imbalance introduced by differential sine wave input. Since the V-to-I converter is driven to a null, there is no nonlinearity to correct, and this section of the circuit has a total harmonic distortion of 100 dB down.

The power output stages form the loop integrator with the driver as an input transconductance. The output load is directly connected to the loop integrator in order that large capacitive loads can be driven. It is necessary to drive the LVDT through a long cable if the application is in an environment hostile to silicon circuitry. Another requirement is to current limit into an inductive load. When current limit turns on, di/dt goes from large to zero, causing the inductor voltage to collapse. When the core of an LVDT is removed, the primary inductance drops by about a factor of ten, and this is when the most severe overloads can be expected. The distortion of the amplifier is about 50 dB down when driving 25 milliamps and increases to 100 dB down with no load. The output stack for one power amplifier comprises transistors 570, 572 and 574, while the output stack for the other power amplifier comprises transistors 576, 578, 580.

A thermal shutdown circuit for the primary driver includes transistors 582, 584, 586, 588, 590 and 592. The thermal shutdown circuit produces a current which increases rapidly as a function of temperature. The collector of transistor 584 is coupled to the collector of transistor 549, the current source for the sine wave shaper. When the current through transistor 584 increases due to a temperature increase, the sine wave shaper emitter current is reduced. As a result, output amplitude of the sine wave shaper decreases without substantial harmonic distortion. The thermal shutdown circuit is designed to begin reducing the current through the sine wave shaper at about 145° C. and to gradually reduce the current to zero at about 165° C. It will be understood that different temperature ranges can be selected for operation of the thermal shutdown circuit.

The gradual reduction in sine wave output amplitude as a function of temperature produced by the thermal shutdown circuit is particularly advantageous in connection with the LVDT decoder described hereinabove. The decoder is relatively insensitive to primary drive signal variations since it calculates the ratio $(A-B)/(A+B)$. Therefore, as the thermal shutdown circuit goes into operation and reduces the sine wave amplitude, the decoder can continue operation with high accuracy. At very low sine wave amplitudes, decoder errors will increase. However, until that point, accurate operation is maintained even though the maximum temperature of the drive circuit has been exceeded. The disclosed thermal shutdown circuit, therefore, provides a soft or gradual thermal shutdown which may be advantageous in cases of temporary high temperatures.

A monolithic integrated circuit incorporating the circuitry of FIGS. 4A-4D and 6A-6C has been constructed for operation with LVDT position transducers. The integrated circuit needs no external active elements and no external adjustments. Measured scale factor stability is 20 parts per million per degree C. Offset stability is 10 parts per million per degree C and nonlinearity is 0.02 percent, far better than that of a typical LVDT. These results were achieved without trimming. With regard to the oscillator 500, measured temperature stability of the sine wave amplitude is 1,000 parts per million per degree C, frequency stability is 250 parts per million per degree C and harmonic distortion is 45 dB down. The integrated circuit described herein dramatically reduces the cost and complexity of using an LVDT position transducer, while providing better performance. The circuit operates either on a single or a dual supply with total supply voltages as low as 10.8 volts. The quiescent current is 12 milliamps. The integrated circuit is fabricated in a junction-isolated bipolar process with 14 micron, 3 ohm-cm epi, SiCr thin film resistors, silicon nitride capacitors and two level metal.

The LVDT interface circuit shown and described hereinabove is substantially insensitive to variations in the primary drive voltage since it calculates the ratio $K(A-B)/(A+B)$. In addition, the circuit described herein eliminates the requirement for phase shifting the primary drive voltage and supplying it to the secondary decoder circuit, thereby eliminating a source of potential errors. Furthermore, the decoder 28 shown and described herein is insensitive to phase shifts which may occur between the two secondary voltages of an LVDT.

Figure 7:
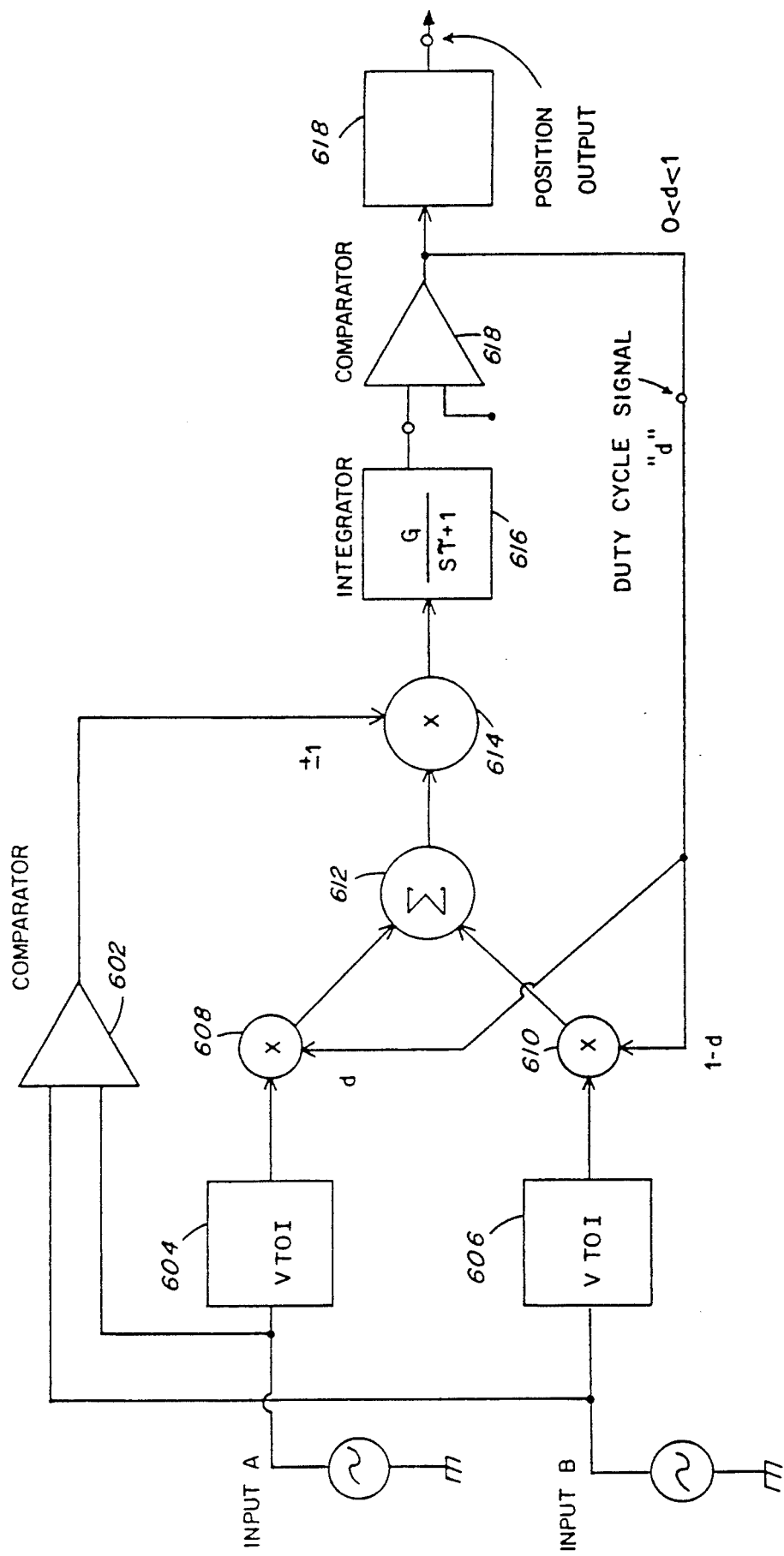
FIG. 7 is a functional block diagram of an alternate embodiment of a decoder.

An alternate embodiment of the decoder is simpler than the decoder of FIG. 3 and is useful in situations where a phase shift between the A and B signals is not expected. An example of such a case may be in decoding the outputs of a bridge circuit. The alternate embodiment is illustrated in block diagram form in FIG. 7. Sine wave signals are processed directly without detection. A single comparator 602 senses the polarity of the A and B input signals and then effects a $+/-1$ multiplication just prior to integration. The INPUT A signal is provided to a V-to-I converter 604, and the INPUT B signal is supplied to a V-to-I converter 606. The output of converter 604 is supplied to a duty cycle multiplier 608, and the output of converter 606 is supplied to a duty cycle multiplier 610. The multipliers 608 and 610 receive duty cycle binary signals d and 1-d, respectively, from the output of a charge balance loop. The outputs of multipliers 608 and 610 are summed in an adder 612, and the adder output 612 is supplied to a multiplier 614. The control input of multiplier 614 is the binary output of comparator 602. The output of multiplier 614 is supplied to an integrator 616, the output of which is sensed by a comparator 618. The output of comparator 618 is the duty cycle binary signals d and 1-d which are coupled to multipliers 608 and 610, respectively. The comparator 618 output is also supplied through an output circuit 620 which may be constructed as described hereinabove in connection with FIGS. 3 and 4A-4D. As noted above, the circuit of FIG. 7 operates satisfactorily when the INPUT A and INPUT B signals are in phase. However, when these signals are phase shifted, the output is erroneous during the time between the zero crossings of the two signals.

Figure 8:
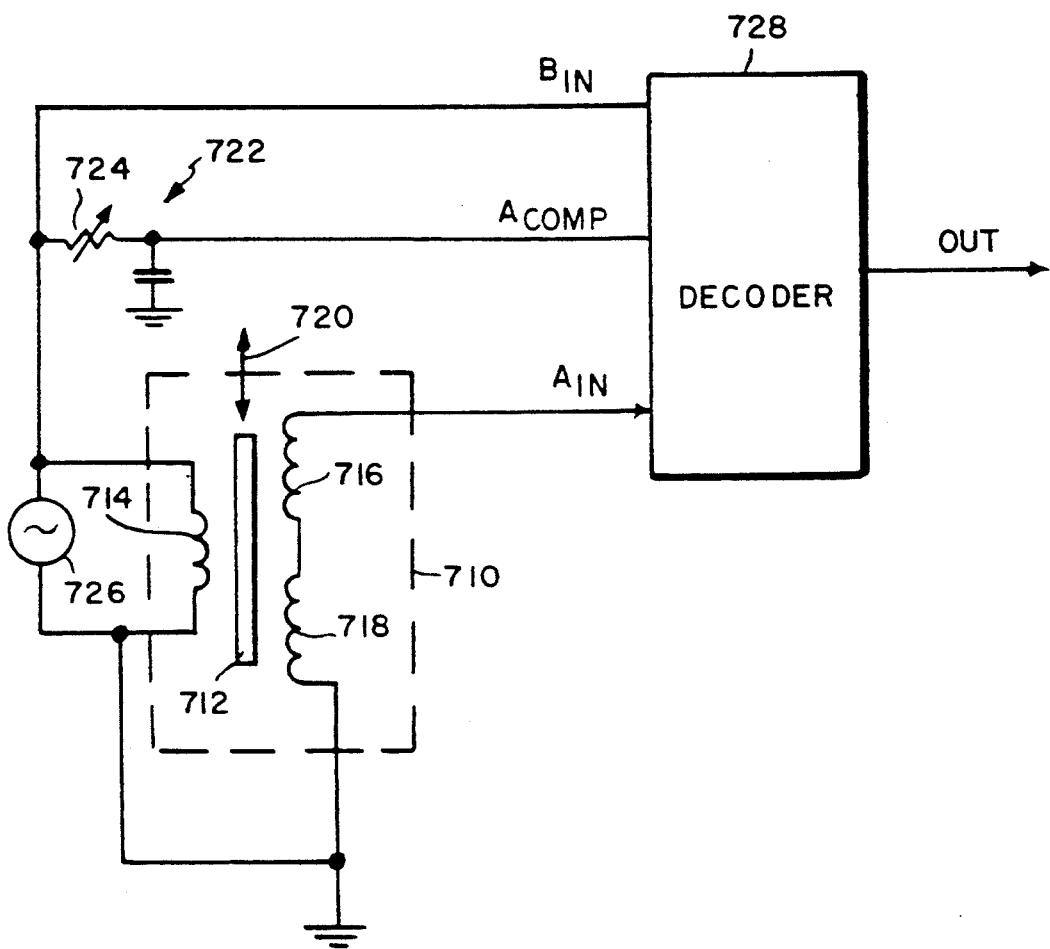
FIG. 8 is a simplified block diagram of another LVDT system in accordance with the present invention.

Interface circuitry that is particularly useful for a five-wire LVDT system as shown in FIGS. 1A and 2 has been described above. This circuitry can be adapted for a four-wire LVDT or half bridge type position transducer. Such transducers are similar to those described above in that they have two windings around a movable core and produce output signals proportional to the core position. A block diagram of a four-wire LVDT system in accordance with the present invention is shown in FIG. 8. An LVDT 710 includes a movable core 712, a primary winding 714 and a pair of secondary windings 716 and 718. The LVDT typically has the shape of a solenoid, with the core 712 linearly movable along the axis in the direction indicated by the arrows 720 in FIG. 8. The primary winding 714 is axially centered in the device, and secondary windings 716 and 718 are located on opposite ends of primary winding 714. A primary driver 726 is connected to primary winding 714. Unlike FIG. 1A, the two secondary windings 716 and 718 in FIG. 8 are connected series opposing so the output is a difference signal which varies linearly with core 712 position. In FIG. 8, secondary windings 716 and 718 are connected to a channel A of a decoder 728, and primary winding 714 is connected to a channel B of decoder 728. Decoder 728 receives inputs $A_{IN}$, $A_{COMP}$ and $B_{IN}$, and computes the ratio A/B. The circuit shown in FIG. 8 is insensitive to the amplitude of the primary drive but is sensitive to phase shifts.

Figure 10:
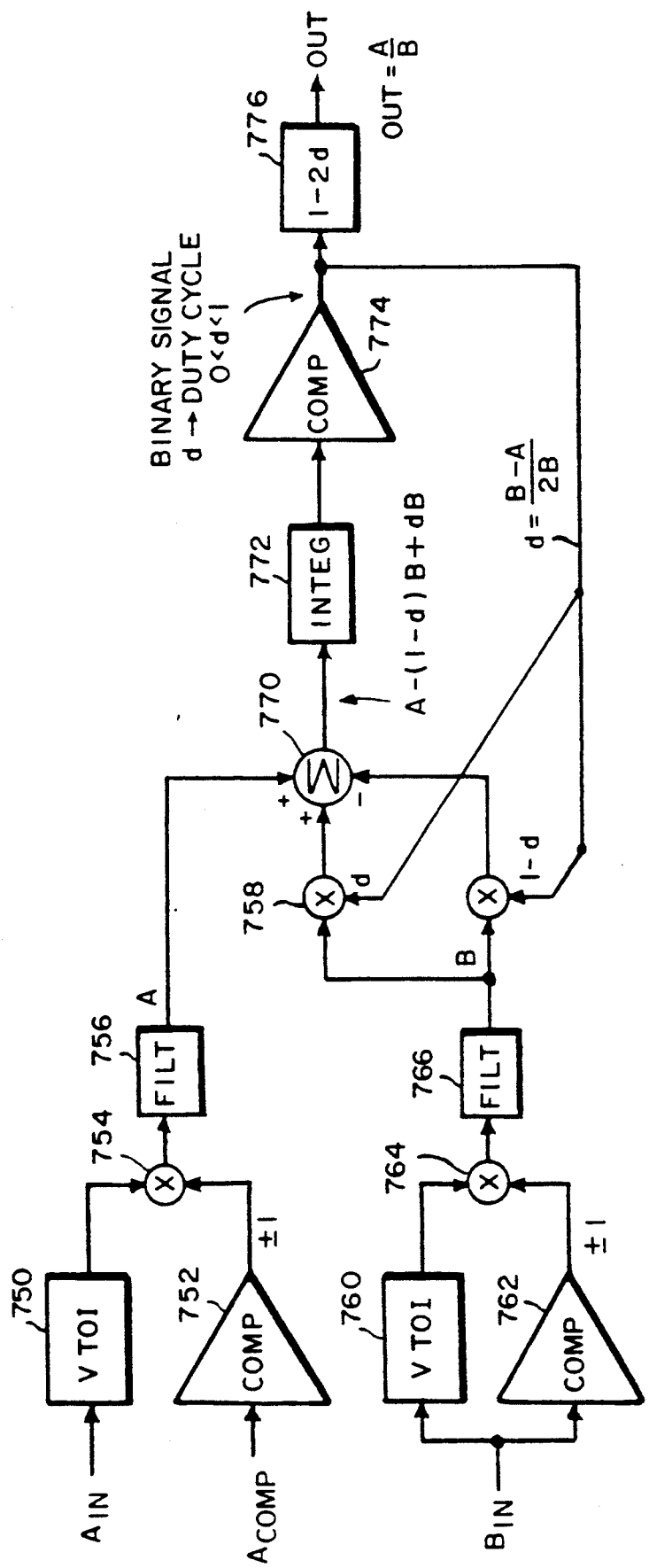
FIG. 10 is a functional block diagram of a decoder that may be utilized in the system of FIGS. 8 and 9.

One problem that has been encountered with this type of LVDT system is that when the core 712 is centered, the output signal amplitude is too small to trigger the input comparator of the full wave rectifier in the decoder of FIG. 10. One way to avoid this problem is to use the primary driver 726 to trigger the A channel comparator 752 in the decoder 728 as discussed below. This allows the use of the entire stroke of LVDT core 712, including the passing through the center position. The phase shift between primary winding 714 and secondary windings 716 and 718 is addressed by introducing a phase delay 722 between input signals $B_{IN}$ and $A_{COMP}$. This phase delay 722 is external and is adjustable with a trim potentiometer 724.

Figure 9:
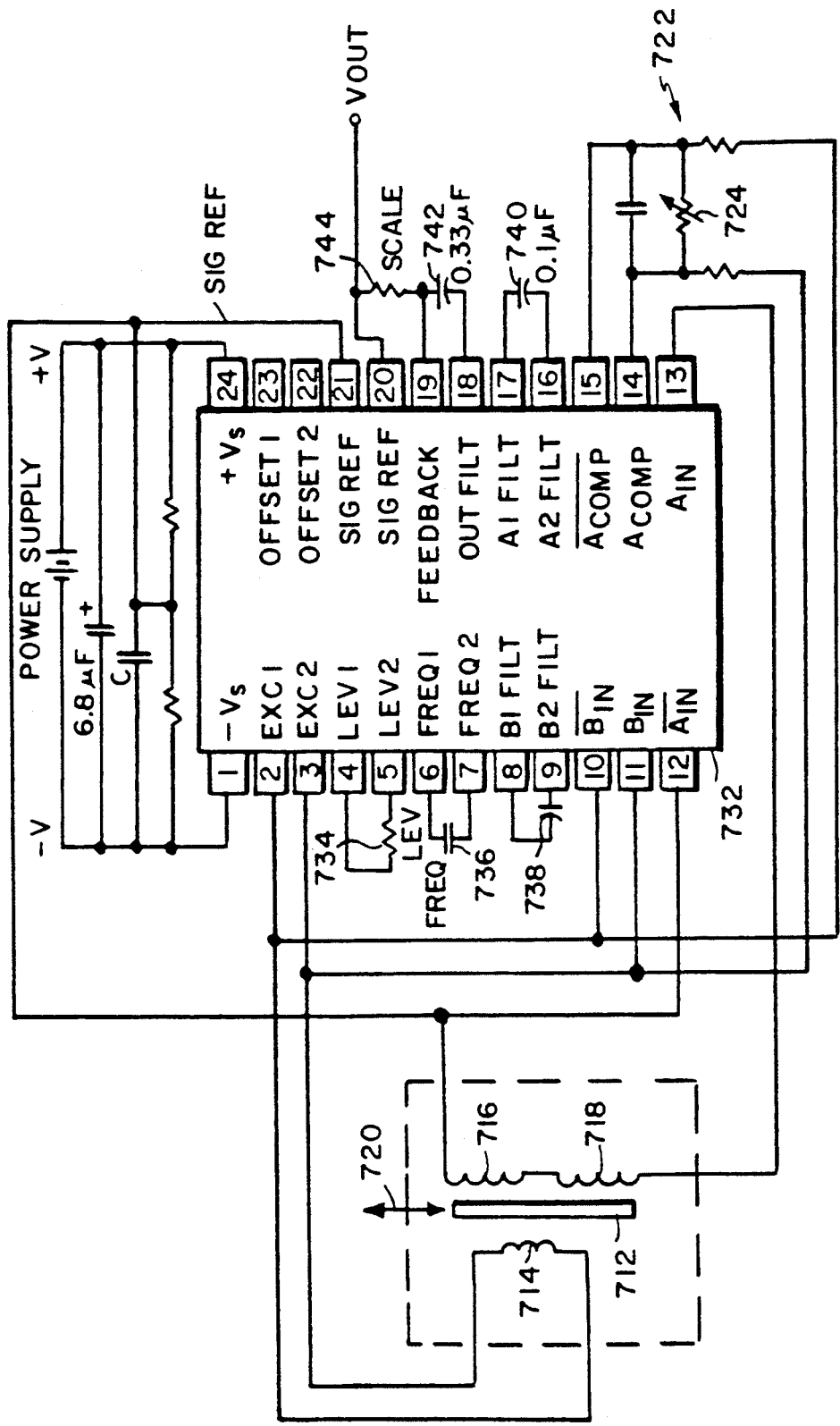
FIG. 9 is an interconnection diagram for the monolithic LVDT interface circuit of FIG. 8 in accordance with the present invention.

As with the LVDT circuit of FIGS. 1-7, the LVDT circuit of FIG. 8 can be realized as a monolithic integrated circuit. An interconnection diagram for such an integrated circuit is shown in FIG. 9. An integrated circuit package 732 includes primary driver 726 and decoder 728. Primary winding 714 is coupled to pins 2 and 3 of package 732; one terminal of secondary winding 716 is coupled to pin 12; and one terminal of secondary winding 718 is coupled to pin 13. The primary drive amplitude is set by a resistor 734, and the primary drive frequency is set by a capacitor 736. A capacitor 738 coupled between pins 8 and 9 and a capacitor 740 coupled between pins 16 and 17 establish time constants of secondary signal filters. A capacitor 742 coupled between pins 18 and 19 establishes a time constant of a duty cycle signal filter in the decoder 728, similar to capacitor 42 shown in FIG. 2 and described above. A resistor 744 coupled between pins 19 and 20 establishes the scale factor between output voltage and core 712 movement. The output signal is taken from pin 20. Positive and negative supply voltages, typically 15 volts, are supplied to pins 24 and 1, respectively.

A block diagram of decoder 728 is shown in FIG. 10. The input signal $A_{IN}$ is supplied to a voltage-to-current converter 750, and input signal $A_{COMP}$ is supplied to a comparator 752. The outputs of converter 750 and comparator 752 are supplied to a multiplier 754. The output of multiplier 754 is coupled through a lowpass filter 756 to an adder 770. Input signal $B_{IN}$ is supplied to a voltage-to-current converter 760 and to a comparator 762, the outputs of which are coupled to the inputs of a multiplier 764. The output of multiplier 764 is coupled through a lowpass filter 766 to duty cycle multipliers 758 and 768. A duty cycle binary signal d is supplied to the other input of duty cycle multiplier 758, and a duty cycle binary signal 1-d is supplied to the other input of duty cycle multiplier 768. The respective outputs of filter 756, duty cycle multiplier 758 and duty cycle multiplier 768 are algebraically summed by adder 770 to provide $A-(1-d)B+dB$. The adder 770 output is provided to an integrator 772, and the integrator output is supplied to a comparator 774. The outputs of comparator 774 are the duty cycle binary signals d and 1-d which are connected back as the inputs to multipliers 758 and 768, respectively. The binary signal d is the logical complement, or inversion, of the binary signal 1-d.

In an alternative embodiment of decoder 728, duty cycle multipliers 758 and 768 are replaced by analog multipliers, and comparator 774 is not used. The duty cycle d is no longer binary, but is now an analog signal. This variation of decoder 728 may find utility where speed is more important than accuracy.

The outputs of comparators 752 and 762 detect the zero crossings of the respective $A_{COMP}$ and $B_{IN}$ signals and toggle the respective multipliers 754 and 764 operating on the sine wave input signals now converted to the current domain, multiplying by +1 or −1 to provide full wave rectification at the outputs of multipliers 754 and 764. The full wave rectified signals are lowpass filtered by filters 756 and 766 to extract a mean absolute deviation measure of the input signal amplitude.

As discussed above, decoder 728 produces the signal A/B. In FIG. 10, the B signal is multiplied by the duty cycle and by the complement of the duty cycle, and the difference between the two products is then taken. This difference is summed with the A signal and then integrated. The rest of FIG. 10 is similar in construction and operation to the decoder of FIG. 3 described above. Since the input to the integrator is driven to zero, the duty cycle, d, is forced to equal $(B-A)/2B$. The comparator 774 output is supplied to an output circuit 776 which corresponds to the output circuit of FIG. 3, including elements 80, 82, 84, 86, 88, 90, 92, 94 and 96. The output of circuit 776 is 1-2d which is equal to A/B.

The outputs of filters 756 and 766 are processed in a charge balance loop comprising multipliers 758 and 768, adder 770, integrator 772 and comparator 774. The multipliers 758 and 768 are differential pair switches with the control input being the binary signal of duty cycle d. When the binary signal d is a square wave of 50% duty cycle, then d =0.5 and each multiplier 758, 768 scales its signal input by 0.5. This corresponds to the center point of the LVDT where signal $A_{IN}$ is zero. When the duty cycle of the binary signal is different from 50%, then the d and 1-d scalings are different. The outputs of multipliers 758 and 768 are subtracted, and the output of filter 756 is added thereto, by adder 770, and the resulting sum is integrated by integrator 772. The output of integrator 772 is compared with a reference level by comparator 774, and the binary output of the comparator is the duty cycle control signal supplied back to multipliers 758 and 768.

The binary signal has a duty cycle d which continuously varies from zero to unity. By inverting the sense of the binary signal at the duty cycle multipliers, the d and 1-d signals are provided. Since the input to the integrator 772 is driven to zero, the output of comparator 774 has a duty cycle $d=(B-A)/2B$. Thus, the duty cycle d of the binary signal provided by the charge balance loop represents the relative amplitudes of the AiM and $B_{IN}$ signals.

Figure 11:
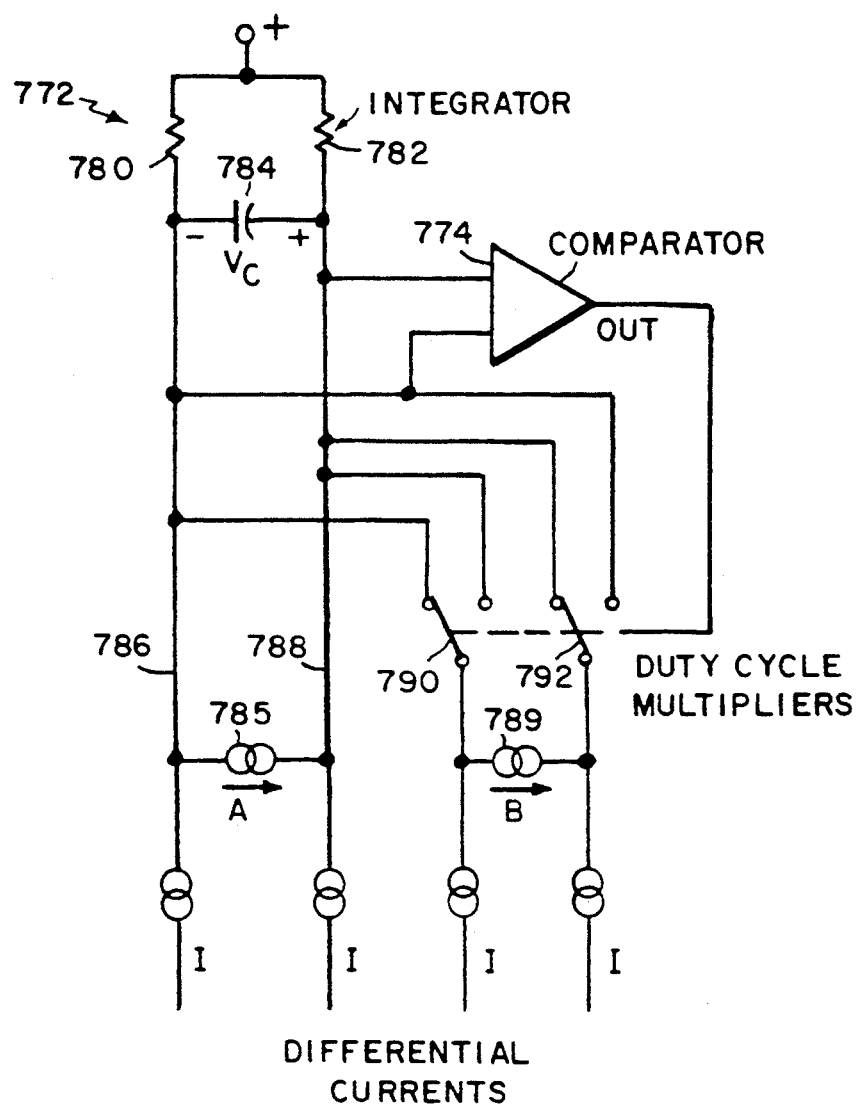
FIG. 11 is a simplified schematic diagram of the change balance loop in the decoder of FIG. 10.

A block diagram representing the charge balance loop of FIG. 10 is shown in FIG. 11. The integrator 772 is represented by resistors 780 and 782 and capacitor 784. The A channel is represented by current source 785 and lines 786 and 788, and the B channel is represented by current source 789 and switches 790 and 792, all of which supply charging current to capacitor 784. The state of switches 790 and 792 is controlled by the output of comparator 774. In the A channel, current is always supplied through capacitor 784. In the B channel, the d controlled current is delivered to the capacitor 784 with the opposite polarity of the 1-d controlled current.

Figure 12A:
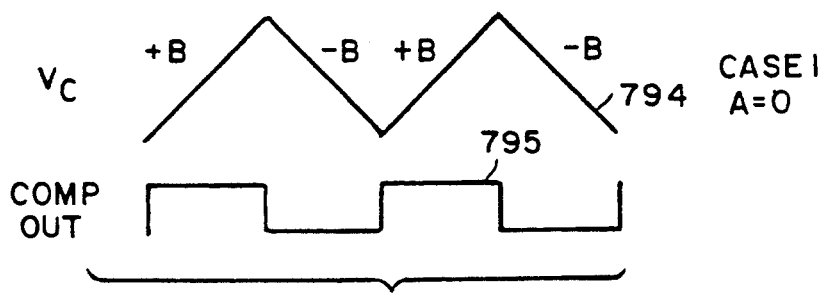
FIGS. 12A–12C are timing diagrams that illustrate the integrator voltage and comparator output in the circuit of FIG. 11 for different input conditions.
Figure 12B:
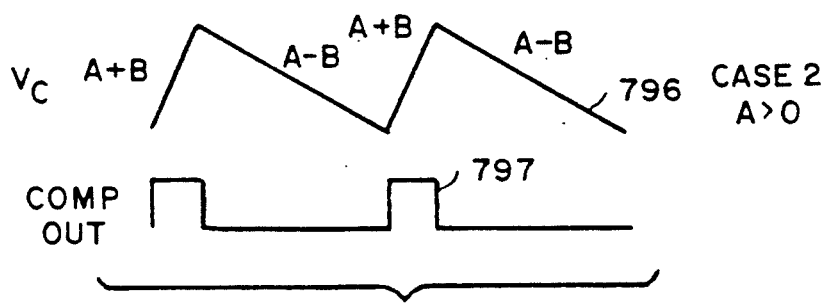
Figure 12C:
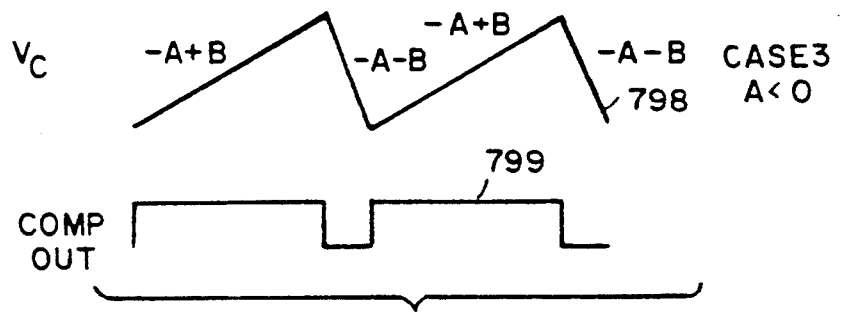

The waveforms in FIGS. 12A–12C illustrate the operation of the charge balance loop. In FIGS. 12A–12C the triangular waves 794, 796 and 798 represent the voltage across capacitor 784, and the binary signals 795, 797 and 799 represent the output of comparator 774. The waveforms for A=zero are shown in FIG. 12A. When A=zero, the triangular wave 794 is symmetrical because only B current flows in and out of capacitor 784. When A is different from zero, as shown in FIGS. 12B and 12C, the capacitor 784 slews up and down at different rates and the duty cycle is modulated. The magnitude of the A input current must be less than the magnitude of the B input current for this circuit to work. Waveform 796 in FIG. 12B illustrates the voltage across capacitor 784 when A is greater than zero. Waveform 798 in FIG. 12C indicates the voltage across capacitor 784 when A is less than zero.

The decoder shown in FIG. 10 can be implemented as a minor modification to the circuit shown in FIGS. 4A–4D. In particular, with reference to FIG. 4C, the collectors of transistors Q239, Q242, Q244, and Q245 are disconnected from the supply voltage VPLUS. The collectors of transistors Q239 and Q244 are connected to the collector of transistor Q206 (FIG. 4A). The collectors of transistors Q242 and Q245 are connected to the collector transistor Q207 (FIG. 4A). The collectors of transistors Q240 and Q246 remain connected to the collector of transistor Q207, and the collectors of transistors Q241 and Q243 remain connected to the collector of transistor Q206. In addition, the values of resistors R206 and R207 (FIG. 4A) are changed from 30K ohms to 15K ohms.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A decoder for processing a pair of signals of equal frequency to determine their relative amplitudes comprising:

means for rectifying and filtering the pair of signals to provide detected A and detected B signals;

a charge balance loop responsive to said detected A and detected B signals for providing a binary signal having a duty cycle representative of B/(A+B) where A and B represent the respective amplitudes of the pair of signals; and output circuit means responsive to said binary signal for providing the value of K(A−B)/(A+B), where K is a constant scale factor.

2. A decoder as defined in claim 1 wherein said charge balance loop comprises:

first multiplier means for multiplying said detected A signal by said binary signal and providing a first multiplier output, second multiplier means for multiplying said detected B signal by said binary signal inverted and providing a second multiplier output, integrator means responsive to said first multiplier output for integrating with one polarity and responsive to said second multiplier output for integrating with the opposite polarity, said integrator means having an output, and comparator means for comparing the output of said integrator means with a predetermined reference level and providing said binary signal.

3. A decoder as defined in claim 2 wherein said first and second multiplier means each comprise differential pair transistors.

4. A decoder as defined in claim 1 wherein said output circuit means comprises:

means for providing a reference current $I_{ref}$;

third multiplier means for multiplying said reference current by said binary signal and providing a third multiplier output, fourth multiplier means for multiplying said reference current by said binary signal inverted and providing a fourth multiplier output, summing means for obtaining a difference current between said third multiplier output and said fourth multiplier output, said difference current representing $I_{ref}(A-B)/(A+B)$, low pass filter means for filtering high frequency components of the difference current output of said summing means, and operational amplifier means for converting the filtered difference current output to an output voltage.

5. A decoder as defined in claim 4 wherein said third multiplier means and said fourth multiplier means together comprise a single differential pair.

6. A decoder as defined in claim 1 wherein said output circuit means comprises:

means responsive to said binary signal for providing a differential current $I_{ref}(A-B)/(A+B)$ where $I_{ref}$ is a reference current, low pass filter means for filtering high frequency components of said differential current, first means for converting said differential current to a single-ended current, and second means for converting said single-ended current to an output voltage relative to a reference voltage input to said second means for converting.

7. A decoder as defined in claim 6 wherein said single-ended current flows through a user selectable two terminal electrical element.

8. A decoder for processing a pair of signals of equal frequency to determine their relative amplitudes, comprising:

means for rectifying and filtering the pair of signals to provide detected A and detected B signals;

a charge balance loop responsive to said detected A and detected B signals for providing a binary signal having a duty cycle representative of (B−A)/2B where A and B represent the respective amplitudes of the pair of signals; and output circuit means responsive to said binary signal for providing the value of K A/B, where K is a constant scale factor.

9. A decoder as defined in claim 8 wherein said charge balance loop comprises:

first multiplier means for multiplying said detected B signal by said binary signal and providing a first multiplier output, second multiplier means for multiplying said detected B signal by said binary signal inverted and providing a second multiplier output, integrator means responsive to said detected A signal and to said first multiplier output for integrating with one polarity and responsive to said second multiplier output for integrating with the opposite polarity, and integrator means having an output, and comparator means for comparing the output of said integrator means with a predetermined reference level and providing said binary signal.

10. A decoder as defined in claim 9 wherein said first and second multiplier means each comprise differential pair transistors.

11. A decoder as defined in claim 8 wherein said output circuit means comprises:

means for providing a reference current, third multiplier means for multiplying said reference current by said control signal and providing a third multiplier output, fourth multiplier means for multiplying said reference current by said control signal inverted and providing a fourth multiplier output, summing means for obtaining a difference current between said third multiplier output and said fourth multiplier output, low pass filter means for filtering high frequency components of the difference current output of said summing means, and operational amplifier means for converting the filtered difference current output to an output voltage.

12. A decoder as defined in claim 11 wherein said third multiplier means and said fourth multiplier means together comprise a single differential pair.

13. A decoder as defined in claim 8 wherein said output circuit means comprises:

means responsive to said control signal for providing a differential current, low pass filter means for filtering high frequency components of said differential current, first means for converting said differential current to a single-ended current, and second means for converting said single-ended current to an output voltage relative to a reference voltage input to said second means for converting.

14. A decoder as defined in claim 13 wherein said single-ended current flows through a user selectable two terminal electrical element.

* * * * *